(12) United States Patent
Takigawa et al.

(10) Patent No.: US 10,507,739 B2
(45) Date of Patent: Dec. 17, 2019

(54) TRAIN-ENERGY CONTROL SYSTEM, GROUND DEVICE, AND ON-BOARD DEVICE

(71) Applicant: MITSUBISHI ELECTRIC CORPORATION, Chiyoda-ku, Tokyo (JP)

(72) Inventors: Yoshihito Takigawa, Tokyo (JP); Tetsuo Komura, Tokyo (JP); Kentaro Hoshino, Tokyo (JP); Masayuki Takeyama, Tokyo (JP); Yoshinori Yamashita, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 546 days.

(21) Appl. No.: 15/116,717

(22) PCT Filed: Feb. 7, 2014

(86) PCT No.: PCT/JP2014/000653
§ 371 (c)(1),
(2) Date: Aug. 4, 2016

(87) PCT Pub. No.: WO2015/118574
PCT Pub. Date: Aug. 13, 2015

(65) Prior Publication Data
US 2016/0347204 A1  Dec. 1, 2016

(51) Int. Cl.
*B60M 3/06* (2006.01)
*B60L 15/40* (2006.01)
(Continued)

(52) U.S. Cl.
CPC ............ *B60M 3/06* (2013.01); *B60L 7/10* (2013.01); *B60L 15/32* (2013.01); *B60L 15/40* (2013.01);
(Continued)

(58) Field of Classification Search
CPC .. B60M 3/06; B60L 7/10; B60L 15/32; B60L 15/40; B61C 17/06; B61L 3/006; B61L 27/0027; B61L 27/0077; B61L 27/04
See application file for complete search history.

(56) References Cited

U.S. PATENT DOCUMENTS

2006/0005739 A1* 1/2006 Kumar .................. B60L 7/06
105/35
2007/0278059 A1* 12/2007 Afriat .................. B60M 3/06
191/29 R
(Continued)

FOREIGN PATENT DOCUMENTS

DE  196 52 407 C1  6/1998
DE  196 54 960 A1  7/1998
(Continued)

OTHER PUBLICATIONS

Extended European Search Report dated Aug. 22, 2017, issued by the European Patent Office in corresponding European Application No. 14881944.4. (7 pages).
(Continued)

*Primary Examiner* — Jason C Smith
(74) *Attorney, Agent, or Firm* — Buchanan Ingersoll & Rooney PC

(57) ABSTRACT

A ground device includes a control unit, a storage unit, and a ground transmitting and receiving unit. A ground antenna is connected to the ground transmitting and receiving unit. Train information from an on-board device is received by the ground transmitting and receiving unit via the ground antenna, and is then transmitted to the control unit. Meanwhile, information from the control unit is transmitted to the on-board device via the ground transmitting and receiving unit and the on-board antenna. The control unit accumulates the train information on a train in the storage unit, and also transmits, to the on-board device, command information for a device installed in the train.

16 Claims, 15 Drawing Sheets

(51) Int. Cl.
*B61L 3/00* (2006.01)
*B61L 27/00* (2006.01)
*B60L 7/10* (2006.01)
*B60L 15/32* (2006.01)
*B61C 17/06* (2006.01)
*B61L 27/04* (2006.01)
*B60L 55/00* (2019.01)

(52) U.S. Cl.
CPC .............. *B60L 55/00* (2019.02); *B61C 17/06* (2013.01); *B61L 3/006* (2013.01); *B61L 27/0027* (2013.01); *B61L 27/0077* (2013.01); *B61L 27/04* (2013.01); *B60L 2200/26* (2013.01); *B61L 2201/00* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 2013/0253746 A1 | 9/2013 | Choi et al. | |
| 2014/0152087 A1* | 6/2014 | Nakatsuka | B60M 3/02 307/9.1 |
| 2016/0297323 A1* | 10/2016 | Voyer | B61L 27/0077 |
| 2016/0304000 A1* | 10/2016 | Barlini | B60M 7/003 |
| 2016/0347204 A1* | 12/2016 | Takigawa | B61L 3/006 |
| 2017/0197518 A1* | 7/2017 | Myers | B60L 7/10 |
| 2017/0305300 A1* | 10/2017 | Katsumata | B60M 3/06 |
| 2018/0123388 A1* | 5/2018 | Itaya | H02J 3/12 |

FOREIGN PATENT DOCUMENTS

| | | |
|---|---|---|
| JP | 2001158356 A | 6/2001 |
| JP | 2004-304989 A | 10/2004 |
| JP | 2006-254536 A | 9/2006 |
| JP | 2008-148531 A | 6/2008 |
| JP | 2008245485 A | 10/2008 |
| JP | 2009-183079 A | 8/2009 |
| JP | 2012-040955 A | 3/2012 |
| JP | 2012-175803 A | 9/2012 |
| JP | 2012-197055 A | 10/2012 |

OTHER PUBLICATIONS

Office Action dated Oct. 4, 2016, by the Japanese Patent Office in corresponding Japanese Patent Application No. 2015-560850 and partial English translation of the Office Action. (5 pages).

International Search Report (PCT/ISA/210) dated Apr. 22, 2014, by the Japanese Patent Office as the International Searching Authority for International Application No. PCT/JP2014/000653.

Written Opinion (PCT/ISA/237) dated Apr. 22, 2014, by the Japanese Patent Office as the International Searching Authority for International Application No. PCT/JP2014/000653.

Office Action (Communication pursuant to Article 94(3) EPC) dated Mar. 14, 2019, by the European Patent Office in corresponding European Patent Application No. 14881944.4. (6 pages).

* cited by examiner

EVALUATION TABLE THAT SHOWS PRIORITY OF POWER-ABSORPTION TARGET

| PRESENT RUNNING STATE | | STORAGE BATTERY STATE | EVALUATION SCORE E(R) |
|---|---|---|---|
| REGENERATIVE-POWER-DISCHARGE TARGET TRAIN | REGENERATION | EMPTY | 10 |
| | | MEDIUM | 8 |
| | | FULL | 0 |
| TRAINS OTHER THAN REGENERATIVE-POWER-DISCHARGE TARGET TRAIN | ACCELERATION | — | 100 |
| | COASTING | EMPTY | 7 |
| | | MEDIUM | 5 |
| | | FULL | 0 |
| | REGENERATION | — | 0 |

EVALUATION TABLE THAT SHOWS PRIORITY OF POWER-ABSORPTION TARGET

| FUTURE RUNNING STATE | | STORAGE BATTERY STATE | EVALUATION SCORE E(F) |
|---|---|---|---|
| TRAINS OTHER THAN REGENERATIVE-POWER-DISCHARGE TARGET TRAIN | ACCELERATION (HIGH) | — | 100 |
| | ACCELERATION (MEDIUM) | — | 80 |
| | ACCELERATION (LOW) | — | 60 |
| | COASTING | EMPTY | 7 |
| | | MEDIUM | 5 |
| | | FULL | 0 |
| | REGENERATION | — | 0 |

EVALUATION TABLE THAT SHOWS PRIORITY OF POWER-DISCHARGE TARGET

| PRESENT RUNNING STATE | | STORAGE BATTERY STATE | EVALUATION SCORE E(R) |
|---|---|---|---|
| POWER-ABSORPTION TARGET TRAIN | ACCELERATION | EMPTY | 0 |
| | | MEDIUM | 8 |
| | | FULL | 10 |
| TRAINS OTHER THAN POWER-ABSORPTION TARGET TRAIN | ACCELERATION | — | 0 |
| | COASTING | EMPTY | 0 |
| | | MEDIUM | 5 |
| | | FULL | 7 |
| | REGENERATION | — | 100 |

FIG.19

EVALUATION TABLE THAT SHOWS PRIORITY OF POWER-DISCHARGE TARGET

| FUTURE RUNNING STATE | | STORAGE BATTERY STATE | EVALUATION SCORE E(F) |
|---|---|---|---|
| TRAINS OTHER THAN POWER-ABSORPTION TARGET TRAIN | ACCELERATION | — | 0 |
| | COASTING | EMPTY | 0 |
| | | MEDIUM | 5 |
| | | FULL | 7 |
| | REGENERATION (LOW) | — | 60 |
| | REGENERATION (MEDIUM) | — | 80 |
| | REGENERATION (HIGH) | — | 100 |

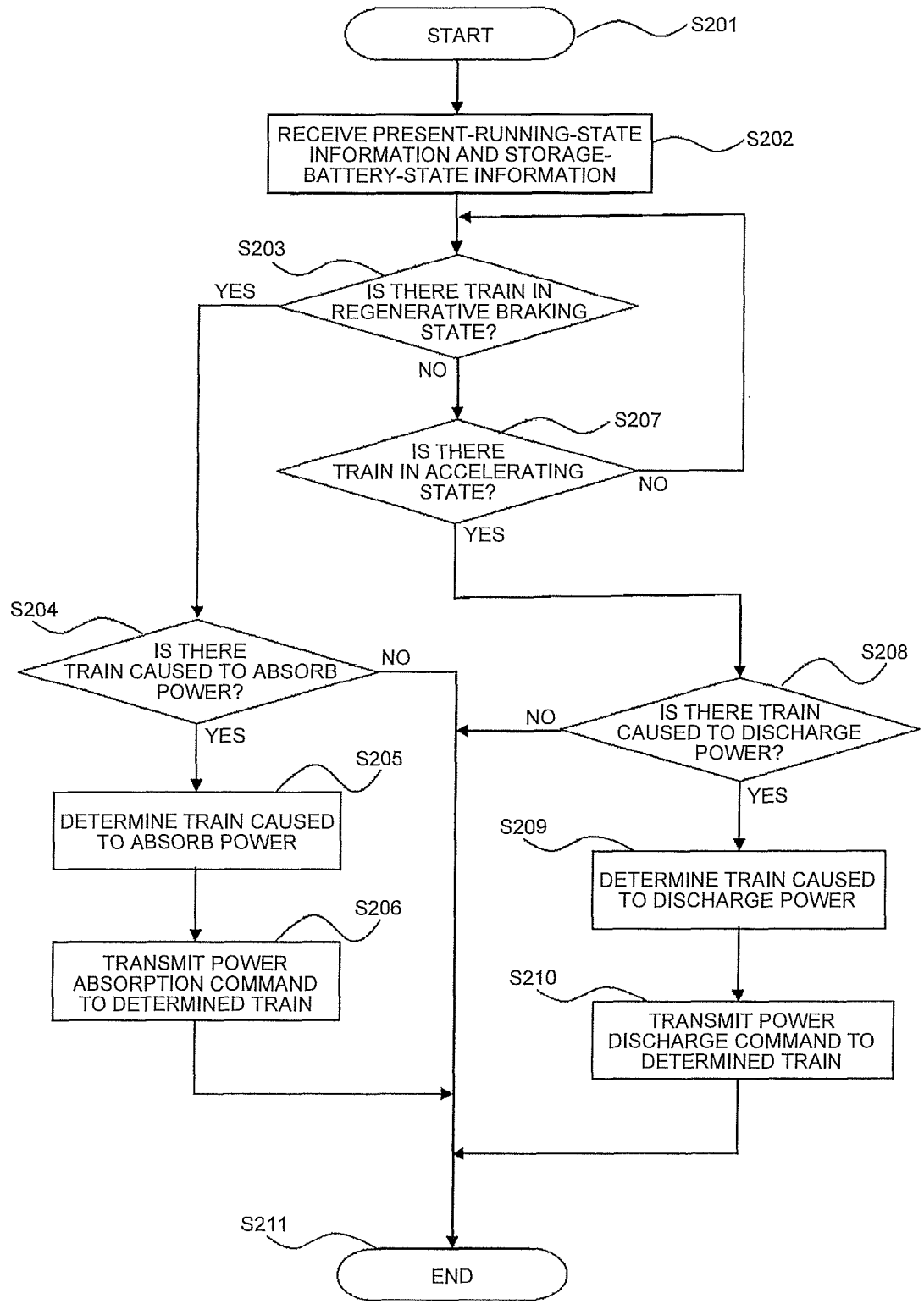

TRAIN-ENERGY CONTROL SYSTEM, GROUND DEVICE, AND ON-BOARD DEVICE

FIELD

The present invention relates to a technique to effectively use regenerative power generated by a train during regenerative braking.

BACKGROUND

In a conventional train-energy control system, in a certain track section along a continuous overhead wire, a train equipped with a power storage unit (a storage battery) charges and discharges the power storage unit via the overhead wire with other trains within the track section.

CITATION LIST

Patent Literature

Patent Literature 1: Japanese Patent Application Laid-open No. 2012-175803 (pages 3 to 5)

SUMMARY

Technical Problem

In a conventional train-energy control system, when reception and supply of power between a train provided with a storage battery and another train within the same feeding section is performed via an overhead wire, the trains directly exchange train information by each using a train-information transmitting device installed therein. Therefore, there is a problem in that unless both of the trains that perform reception and supply of power are present within the communication range of their train-information transmitting devices, the trains cannot exchange the train information with each other, and accordingly cannot receive or supply power from or to each other.

Further, even though both of the trains are present within the communication range of their train-information transmitting devices, when the storage battery installed in one of the trains is in a state of being incapable of absorbing power, this storage battery cannot absorb power from the other train in a regenerative braking state. Furthermore, when the storage battery installed in one of the trains is in a state of being incapable of discharging power, this storage battery cannot supply power to the other train in an accelerating state.

The present invention has been achieved to solve the above problems, and an object of the present invention is to provide a train-energy control system in which it is possible for trains running within the same feeding section to receive and supply power from and to each other even when the trains are out of the communication range of the train-information transmitting devices.

Solution to Problem

A ground device according to an aspect of the present invention includes: a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train; and a control unit that, when the running-state information on one or more of the trains indicates a regenerative braking state, determines a train that absorbs the regenerative power from among the trains on a basis of the running-state information and the storage-battery-state information on the trains, and controls the ground transmitting and receiving unit such that a power absorption command is transmitted to the determined train.

A ground device according to another aspect of the present invention includes: a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train; and a control unit that, when the running-state information on one or more of the trains indicates an accelerating state, determines a train that discharges power from among the trains on a basis of the running-state information and the storage-battery-state information on the trains, and controls the ground transmitting and receiving unit such that a power discharge command is transmitted to the determined train.

A ground device according to still another aspect of the present invention includes: a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train; and a control unit that, when the running-state information on one or more of the trains indicates a regenerative braking state, determines a train that absorbs the regenerative power from among the trains on a basis of the running-state information and the storage-battery-state information on the trains, and controls the ground transmitting and receiving unit such that a power absorption command is transmitted to the determined train, and, when the running-state information on one or more of the trains indicates an accelerating state, determines a train that discharges power from among the trains on a basis of the running-state information and the storage-battery-state information on the trains, and controls the ground transmitting and receiving unit such that a power discharge command is transmitted to the determined train.

An on-board device according to an aspect of the present invention includes: an on-board transmitting and receiving unit that transmits, to a ground device, running-state information that indicates a running state of a train, the running state being any of a regenerative braking state, an accelerating state, and a coasting state, and storage-battery-state information that indicates a state of charge of a storage battery provided in the train, and that receives a power absorption command that instructs a train to absorb power or a power discharge command that instructs a train to discharge power; and a train-information management unit that upon reception of running-state information that indicates a regenerative braking state or an accelerating state from a control device, controls the running-state information such that the running-state information is transmitted by the on-board transmitting and receiving unit, the control device returning regenerative power generated from a motor to an overhead wire or charging the storage battery with the regenerative power, and supplying power from the overhead wire or the storage battery to the motor, and upon reception of the power absorption command or the power discharge command by the on-board transmitting and receiving unit, transmits the power absorption command or the power discharge command to the control device.

A train-energy control system according to an aspect of the present invention includes: a ground device including a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train, and a control unit that, when the running-state information on one or more of the trains indicates a regenerative braking state, determines a train that absorbs the regenerative power from among the trains on a basis of the running-state information and the storage-battery-state information on the trains, and controls the ground transmitting and receiving unit such that a power absorption command is transmitted to the determined train; and an on-board device including an on-board transmitting and receiving unit that transmits, to the ground device, the running-state information and storage-battery-state information, and that receives the power absorption command, and a train-information management unit that upon reception of the running-state information that indicates a regenerative braking state or an accelerating state from a control device, controls the running-state information such that the running-state information is transmitted by the on-board transmitting and receiving unit, the control device returning regenerative power generated from a motor to an overhead wire or charging the storage battery with the regenerative power, and supplying power from the overhead wire or the storage battery to the motor, and upon reception of the power absorption command by the on-board transmitting and receiving unit, transmits the power absorption command to the control device.

A train-energy control system according to another aspect of the present invention includes: a ground device including a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train, and a control unit that, when the running-state information on one or more of the trains indicates an accelerating state, determines a train that discharges the power from among the trains on a basis of the running-state information and the storage-battery-state information on the trains, and controls the ground transmitting and receiving unit such that a power discharge command is transmitted to the determined train; and an on-board device including an on-board transmitting and receiving unit that transmits, to the ground device, the running-state information and storage-battery-state information, and that receives the power discharge command, and a train-information management unit that upon reception of the running-state information that indicates a regenerative braking state or an accelerating state from a control device, controls the running-state information such that the running-state information is transmitted by the on-board transmitting and receiving unit, the control device returning regenerative power generated from a motor to an overhead wire or charging the storage battery with the regenerative power, and supplying power from the overhead wire or the storage battery to the motor, and upon reception of the power discharge command by the on-board transmitting and receiving unit, transmits the power discharge command to the control device.

Advantageous Effects of Invention

The ground device of the present invention recognizes running-state information and storage-battery-state information on a plurality of trains running within the same feeding section. This makes it possible for the trains running within the same feeding section but out of the communication range of the on-board device installed in the train to receive and supply power from and to each other. The on-board device of the present invention transmits running-state information and storage-battery-state information to the ground device. This makes it possible for the train to receive and supply power from and to a train running within the same feeding section but out of the communication range. Further, in the train-energy control system of the present invention, the on-board device transmits running-state information and storage-battery-state information to the ground device, and the ground device recognizes the running-state information and the storage-battery-state information on a plurality of trains running within the same feeding section. This makes it possible for the trains running within the same feeding section but out of the communication range of the on-board device installed in the train to receive and supply power from and to each other.

BRIEF DESCRIPTION OF DRAWINGS

FIG. 19 is an evaluation table in which an evaluation score that indicates the priority of a power-discharge target is described in the fourth embodiment.

FIG. 20 is a flowchart illustrating a process of transmitting a power absorption command and a process of transmitting a power discharge command from the ground device in a fifth embodiment.

DESCRIPTION OF EMBODIMENTS

First Embodiment

Figure 1:
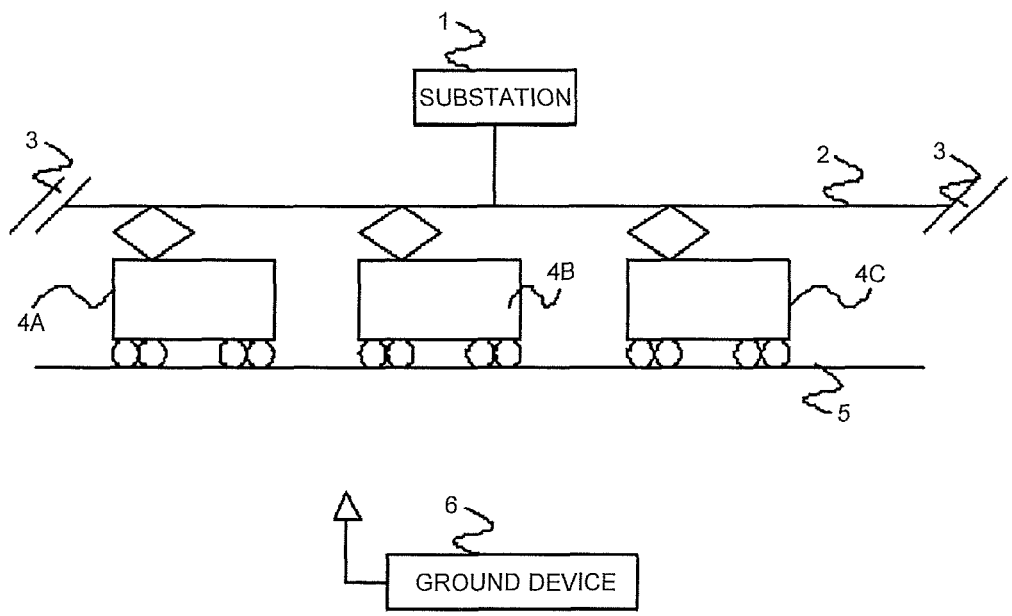
FIG. 1 is a configuration diagram of a train-energy control system according to a first embodiment.

FIG. 1 is a configuration diagram of a train-energy control system according to a first embodiment of the present invention. In the drawings, elements denoted with like reference signs correspond to identical or equivalent elements, and this holds true for the entire specification.

In FIG. 1, a substation 1 is connected to an overhead wire 2 and supplies power to the overhead wire 2. A section 3 is a facility provided to electrically insulate the overhead wire 2 from its adjacent feeding section. Trains 4A to 4C run within the same feeding section that is supplied with power from the substation 1. While each of the trains 4A to 4C is drawn as a single-car train, it is also possible that the train is constituted by a plurality of cars. A rail 5 is used as a return for the current supplied from the overhead wire 2. A ground device 6 exchanges information with the trains 4A to 4C and is capable of transmitting and receiving information to and from the trains 4A to 4C running within the same feeding section.

Figure 2:
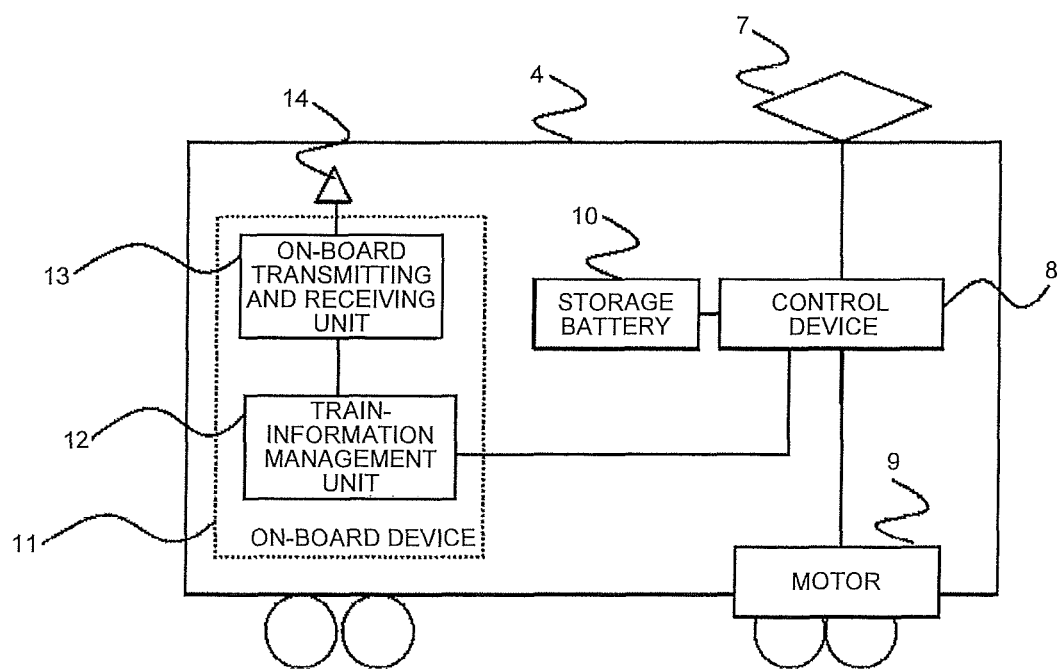
FIG. 2 is an explanatory diagram of a configuration of a train according to the first embodiment.

FIG. 2 is an explanatory diagram of a configuration of a train according to the first embodiment of the present invention. A train 4 includes a pantograph 7, which receives power from the overhead wire 2; a motor 9, which drives the wheels of the train 4; a storage battery 10, which stores therein power; a control device 8, which controls the power of the motor 9 and the storage battery 10; and an on-board device 11, which stores therein train information on the train 4 and transmits the train information to the ground device 6. The pantograph 7 is connected to the control device 8. The control device 8 is connected to the motor 9 and the storage battery 10. When the train 4 accelerates, the control device 8 converts the power from the overhead wire 2 to power with an appropriate voltage and frequency to drive the motor 9. When the train 4 is regeneratively braking, the control device 8 converts the regenerative power generated from the motor 9 to power with an appropriate voltage and frequency and supplies the converted power to the overhead wire 2 via the pantograph 7. Further, the control device 8 converts the power from the overhead wire 2 or the regenerative power from the motor 9 to power with a voltage appropriate for the storage battery 10 to charge the storage battery 10. Furthermore, the control device 8 has a function of converting the power stored in the storage battery 10 to power with an appropriate voltage and frequency, and discharging the converted power to the overhead wire 2 or supplying the converted power to the motor 9.

The on-board device 11 has a train-information management unit 12 and an on-board transmitting and receiving unit 13 incorporated therein. The train-information management unit 12 is connected to the control device 8 and a brake device (not illustrated), and transmits an acceleration or braking control command from the driver's cab (not illustrated) to the control device 8 or the brake device. The train-information management unit 12 transmits, to the control device 8, a command that instructs it to charge or discharge the storage battery 10. The train-information management unit 12 receives train information that indicates the operating state of each device installed in the train 4, including the control device 8. Train information, to be received by the train-information management unit 12 from the control device 8, includes running-state information that indicates any of the accelerating state, the regenerative braking state, and the coasting state; storage-battery-state information that indicates the remaining charge of the storage battery 10; and other information. For example, the state of charge of the storage battery 10 is expressed as "full", which indicates full charge when the remaining charge is equal to or greater than 80%, as "medium", which indicates the medium charge amount when the remaining charge is equal to or greater than 20% and less than 80%, and as "empty" when the remaining charge is equal to or less than 20%. It is possible to define "full", "medium", and "empty" that express the storage battery state in any manner. Other train information received from the control device 8 includes the current, voltage, or frequency of the motor 9; the current, voltage, or power value received from the overhead wire 2 during acceleration; and the current, voltage, or power value returned to the overhead wire 2 during regenerative braking. The train information also includes the route information held by the train-information management unit 12, such as the present running position (in kilometers), the speed, the starting station, and the destination.

The train-information management unit 12 transmits the train information as described above to the ground device 6 via the on-board transmitting and receiving unit 13 and an on-board antenna 14. Information transmitted from the ground device 6 is received by the train-information management unit 12 via the on-board antenna 14 and the on-board transmitting and receiving unit 13.

It is also possible that the train 4 is constituted by a plurality of cars. In the case where the train 4 is constituted by a plurality of cars, it is also possible that the pantograph 7, the control device 8, the motor 9, the storage battery 10, and the on-board device 11 are installed in the cars. However, in a single train 4, a single on-board device 11 transmits and receives information to and from the ground device 6.

Figure 3:
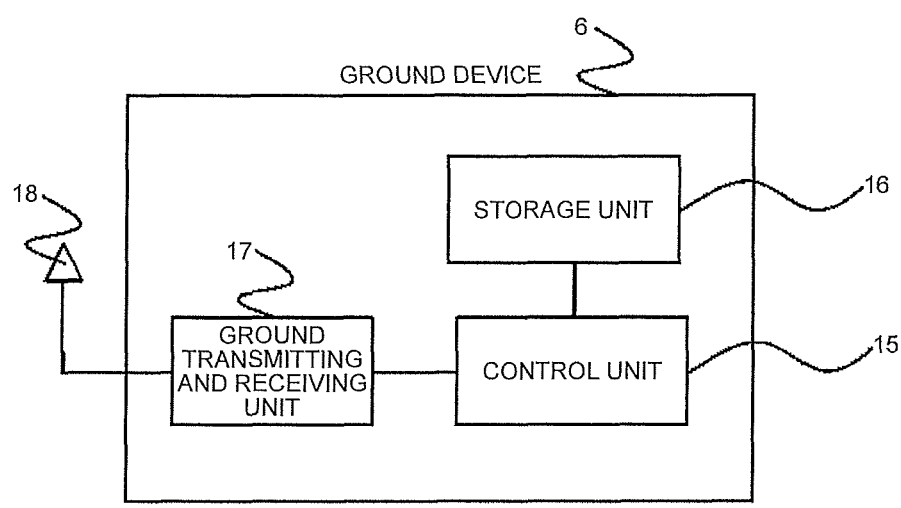
FIG. 3 is an explanatory diagram of a configuration of a ground device according to the first embodiment.

FIG. 3 is an explanatory diagram of a configuration of a ground device according to the first embodiment of the present invention. The ground device 6 includes a control unit 15, a storage unit 16, and a ground transmitting and receiving unit 17. A ground antenna 18 is connected to the ground transmitting and receiving unit 17. Train information from the on-board device 11 is received by the ground transmitting and receiving unit 17 via the ground antenna 18 and is then transmitted to the control unit 15. Meanwhile, information from the control unit 15 is transmitted to the on-board device 11 via the ground transmitting and receiving unit 17 and the ground antenna 18. The control unit 15 accumulates the train information on the train 4 in the storage unit 16, and also transmits, to the on-board device 11, command information for a device installed in the train 4. In FIG. 3, only a single ground antenna 18 is drawn. However, in order to make it possible for the train 4 to transmit and receive information to and from the trains 4 running within the same feeding section, it is also possible that a plurality of ground antennas 18 are provided along the running section of the trains 4.

An explanation will be given below of the operation, in which, when a certain train 4 starts regenerative braking, the ground device 6 transmits, to another train 4 running within the same feeding section, a power absorption command that instructs it to absorb power.

Figure 4:
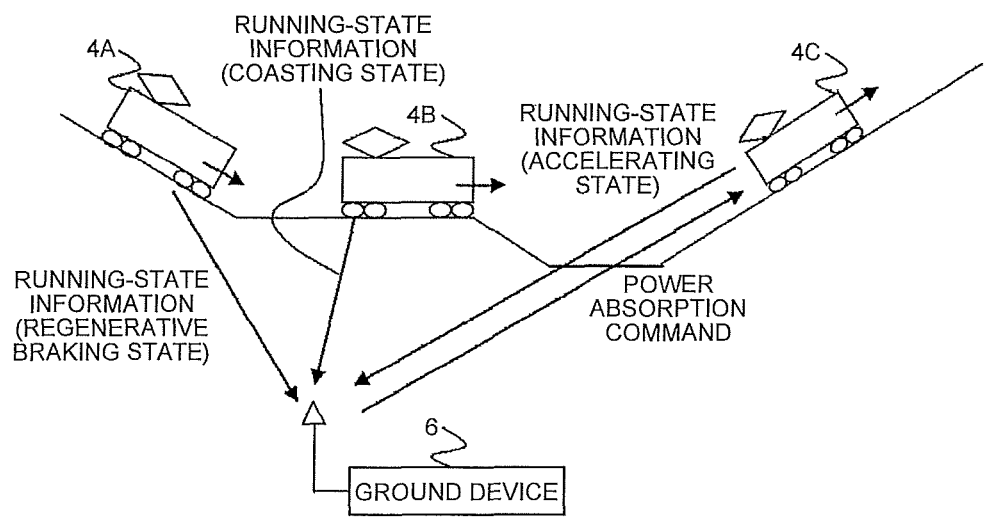
FIG. 4 is a diagram schematically illustrating a first condition of trains 4A to 4C in the first embodiment.

FIG. 4 is a diagram schematically illustrating a first condition of the trains 4A to 4C in the first embodiment of the present invention. Each of the trains 4A to 4C running within the same feeding section transmits train information including the running-state information periodically to the ground device 6. In FIG. 4, the train 4A is in a regenerative braking state, the train 4B is in a coasting state, and the train 4C is in an accelerating state. The ground device 6 determines the train 4C as the train 4 that is caused to absorb the regenerative power, and transmits, to the determined train 4C, a power absorption command that instructs the train 4C to absorb the regenerative power.

Figure 5:
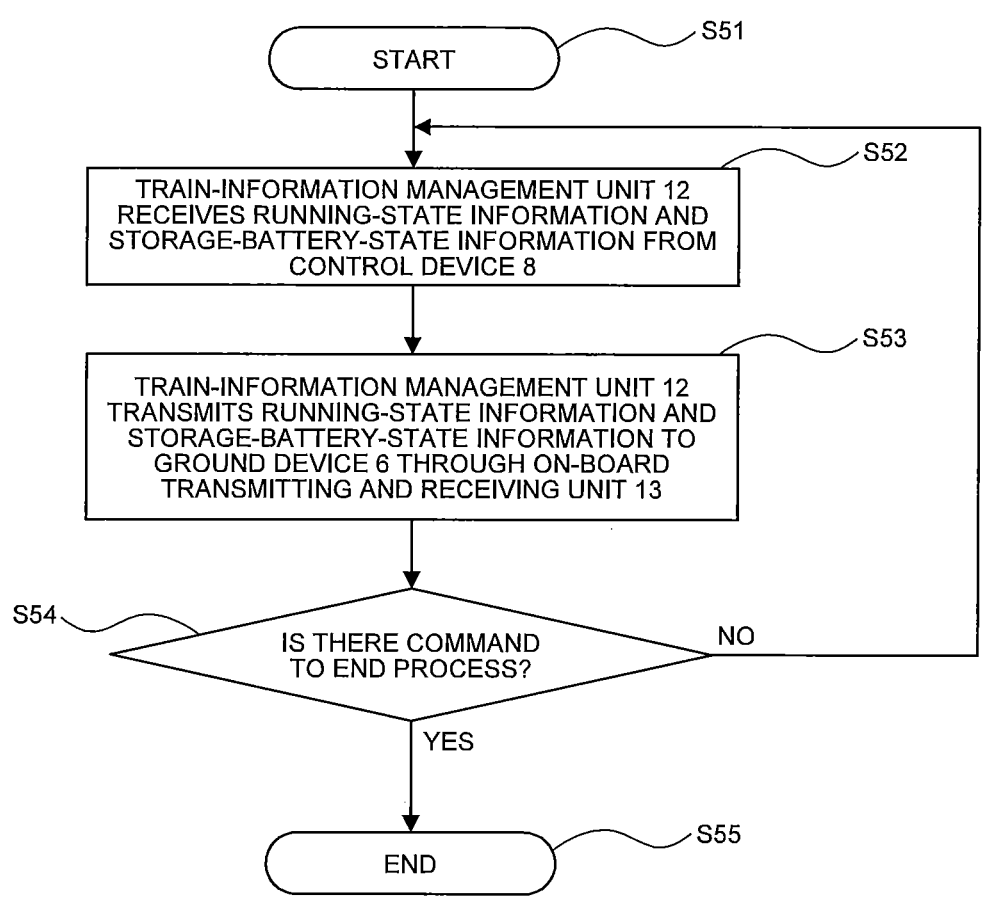
FIG. 5 is a flowchart illustrating a process of transmitting train information from an on-board device to a ground device in the first embodiment.

FIG. 5 is a flowchart illustrating a process of transmitting train information from an on-board device to a ground device in the first embodiment of the present invention. Upon starting the process at Step S51, the train-information management unit 12 receives train information including the running-state information and the storage-battery-state information from the control device 8 at Step S52. Next, at Step S53, the train-information management unit 12 transmits the train information received from the control device 8 to the ground device 6 via the on-board transmitting and receiving unit 13 and the on-board antenna 14. Subsequently, at Step S54, the train-information management unit 12 checks whether it has received a command to end the process of transmitting train information. When the train-information management unit 12 has not received the command to end the process of transmitting train information, the process flow returns to Step S52 to periodically repeat Steps S52 to S54, and periodically transmit the running-state information and the storage-battery-state information to the ground device 6. At Step S54, when the train-information management unit 12 has received the command to end the process of transmitting train information, the train-information management unit 12 ends the process of transmitting train information at Step S55.

Figure 6:
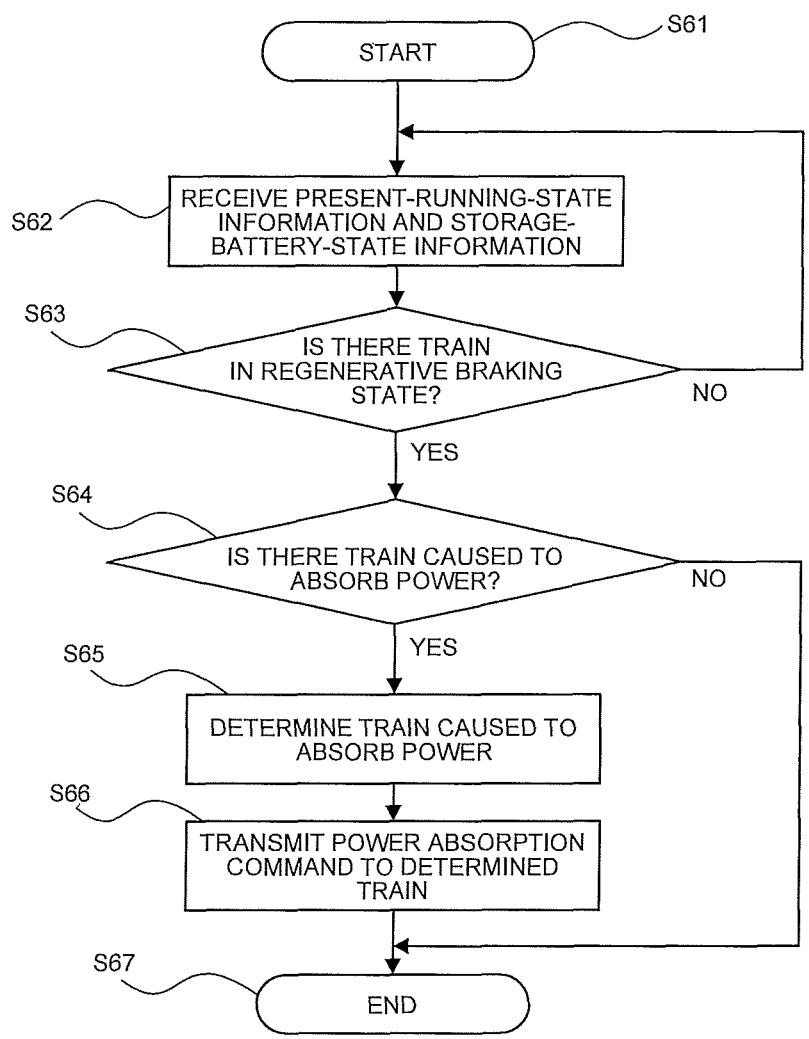
FIG. 6 is a flowchart illustrating a process of transmitting a power absorption command from a ground device in the first embodiment.

FIG. 6 is a flowchart illustrating a process of transmitting a power absorption command from a ground device in the first embodiment of the present invention. Step S61 indicates the start of an operation. At Step S62, the ground transmitting and receiving unit 17 in the ground device 6 receives train information from the on-board device 11 via the ground antenna 18. At Step S63, the control unit 15 checks the received running-state information on each of the trains 4, and determines whether there is any train 4 that has running-state information indicating a regenerative braking state (referred to as "regenerative-power-discharge target train"). When there is no train 4 that has running-state information indicating a regenerative braking state (the regenerative-power-discharge target train), then the process flow returns to Step S62. When there is the train 4 in a regenerative braking state (the regenerative-power-discharge target train), the process flow advances to Step S64. At Step S64, on the basis of the running-state information and the storage-battery-state information on each of the trains 4, the control unit 15 determines whether there is any train 4 that is capable of absorbing the regenerative power. When there is the train 4 that is capable of absorbing the regenerative power, the process flow shifts to Step S65. When there is no train 4 that is capable of absorbing the regenerative power, the process flow shifts to Step S67 and then the process flow ends. At Step S65, on the basis of the running-state information and the storage-battery-state information, the control unit 15 determines an appropriate train to absorb power. At Step S66, the control unit 15 transmits, to the train determined at Step S65, a power absorption command that instructs this train to absorb the regenerative power. The power absorption command is transmitted from the control unit 15 to the on-board device 11 via the ground transmitting and receiving unit 17 and the ground antenna 18. The process flow ends at Step S67. The ground device 6 periodically repeats the operation at Steps S61 to S67.

In FIG. 6, as a method for the control unit 15 to determine whether there is any train 4 that is caused to absorb regenerative power of the regenerative-power-discharge target train (Step S64), and as a method for the control unit 15 to determine the train 4 that is caused to absorb regenerative power of the regenerative-power-discharge target train (Step S65), in the present embodiment, an explanation will be given below of the method for performing the determination according to an evaluation table in which an evaluation score that indicates a predetermined priority is described.

Figures 7, 8:
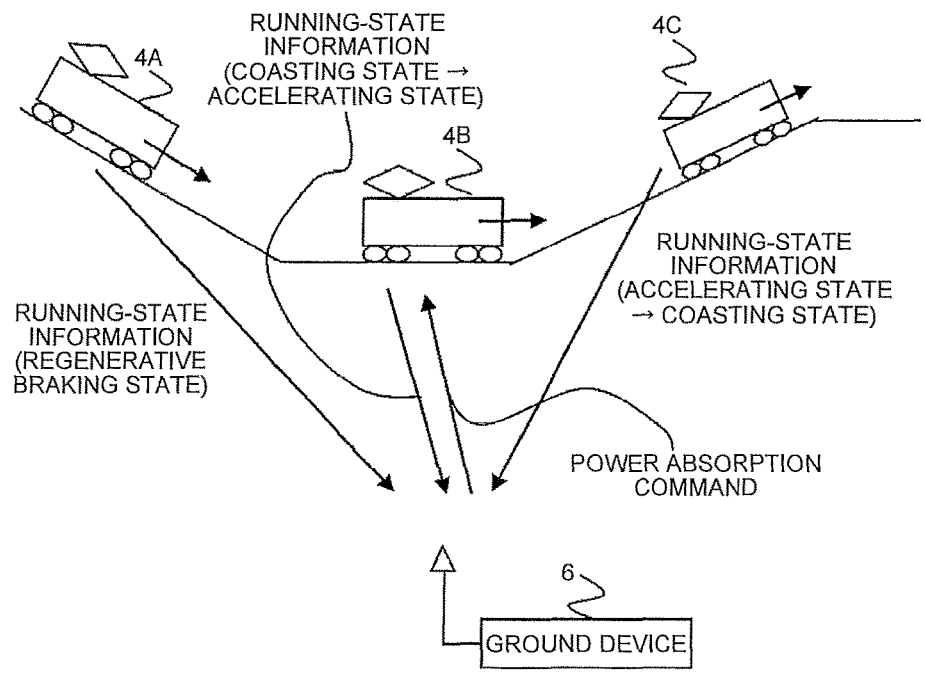
FIG. 7 is an evaluation table in which an evaluation score that indicates the priority of a power-absorption target is described according to the first embodiment.
FIG. 8 is a diagram schematically illustrating a second condition of the trains 4A to 4C in a second embodiment.

FIG. 7 is an example of an evaluation table (a first table) in which an evaluation score that indicates the priority (a first priority) of a power-absorption target is described in the first embodiment of the present invention. In FIG. 7, the evaluation score of a power-absorption target is set according to the present running state of the train 4 and the present storage battery state of the storage battery 10 installed in the train 4. The evaluation score having a greater numerical value is more suitable as a condition, and a greater numerical value indicates a higher priority. However, the evaluation scores are described merely for the purpose of relatively evaluating each item. In the evaluation table illustrated in FIG. 7, for example, among the trains 4 in a regenerative braking state and the trains 4 running within the same feeding section as the train 4 in a regenerative braking state, the train 4 in an accelerating state is considered to be most appropriate to absorb the regenerative power. Therefore, the evaluation score of the train 4 in an accelerating state is set to the highest value. When the regenerative-power-discharge target train is compared with the train 4 in a regenerative braking state that is other than the regenerative-power-discharge target train and is running within the same feeding section, it is considered to be more efficient to supply and receive the power within the regenerative-power-discharge target train. Therefore, the evaluation score of the train 4 in a regenerative braking state other than the regenerative-power-discharge target train is set to 0. When the storage battery 10 in the regenerative-power-discharge target train is fully charged and also when the storage battery 10 in the train 4 in a coasting state, which is running within the same feeding section, is fully charged, these trains cannot be a power-absorption target. Therefore, the evaluation score of the regenerative-power-discharge target train with its storage battery fully charged and the evaluation score of the train 4 in a coasting state with its storage battery fully charged are both set to 0 points. In the case where the storage battery 10 of the train 4 in a coasting state, which is running within the same feeding section as a regenerative-power-discharge target train, and the storage battery 10 of this regenerative-power-discharge target train are both not in a fully-charged state, it is considered to be more efficient to charge the storage battery 10 of the regenerative-powerdischarge target train than to charge the storage battery 10 of the train 4 in a coasting state. Therefore, in the case where the storage batteries 10 are in the same state of charge, the evaluation score of the regenerative-power-discharge target train is set higher than the evaluation score of the train 4 in a coasting state. FIG. 7 is merely an example, and it is also possible that the evaluation scores are set by carrying out running tests on the trains 4 in practice. The evaluation table in FIG. 7 is stored as a reference table (a first table) in the storage unit 16 in the ground device 6.

At the time of performing the determination at Step S64 in FIG. 6, the control unit 15 reads the reference table (the first table) in FIG. 7 from the storage unit 16, and applies the running-state information and the storage-battery-state information to the reference table to determine the evaluation score of each of the trains 4. In the case where the evaluation scores of all the trains 4 are 0, the control unit 15 determines that there is no train that is capable of absorbing the regenerative power, and then shifts to Step S67 to end the process flow. When there is the train 4 with its evaluation score greater than 0, the control unit 15 determines that there is the train 4 that is capable of absorbing the regenerative power, and then shifts to Step S65. At Step S65, the control unit 15 determines the train 4 with the highest evaluation score as the train 4 that needs to absorb the regenerative power. In the case where the evaluation scores of all the trains 4 are 0, there is no train 4 that absorbs the regenerative power. Therefore, regeneration cancellation occurs, and the regenerative power cannot be effectively used.

In the example in FIG. 4, when the train 4B is in a coasting state (storage battery state: empty) and the train 4C is in an accelerating state, the control unit 15 determines that the evaluation score of the train 4B is 7 points and the evaluation score of the train 4C is 100 points. When the storage battery state of the train 4A is empty, the control unit 15 determines that the evaluation score of the train 4A is 10 points. As a result, the control unit 15 determines the train 4C with the highest evaluation score as the train 4 appropriate to absorb regenerative power of the train 4A.

In the example of FIG. 4, the train 4 equipped with the storage battery 10 is assumed to be a regenerative-power-absorption target. However, a power storage facility (not illustrated) located on the ground, e.g., inside the station or on a railroad, may be determined as a regenerative-power-absorption target. The power storage facility located on the ground can be regarded the same as the train 4 in a coasting state. Therefore, the evaluation score of the power storage facility can be determined by using the reference table (the first table) in FIG. 7. The evaluation score of the train 4 in a coasting state may be used as an evaluation score of the power storage facility in the reference table (the first table) in FIG. 7, or the evaluation score of the power storage facility may be set separately from the train 4 in a coasting state.

As described above, the train-energy control system in the first embodiment includes a ground device including a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train, and a control unit that, when the running-state information on one or more of the trains indicates a regenerative braking state, determines a train that absorbs regenerative power from among the trains on a basis of the running-state information and the storage-battery-state information on the trains, and controls the ground transmitting and receiving unit such that a power absorption command is transmitted to the determined train; and an on-board device including an on-board transmitting and receiving unit that transmits, to the ground device, the running-state information and the storage-battery-state information, and that receives the power absorption command, and a train-information management unit that, upon reception of the running-state information that indicates a regenerative braking state or an accelerating state from a control device, controls the running-state information such that the running-state information is transmitted by the on-board transmitting and receiving unit, the control device returning regenerative power generated from a motor to an overhead wire or charging the storage battery with the regenerative power, and supplying power from the overhead wire or the storage battery to the motor, and, upon reception of the power absorption command by the on-board transmitting and receiving unit, transmits the power absorption command to the control device.

As described above, the ground device in the first embodiment recognizes the running-state information and the storage-battery-state information on the trains running within the same feeding section. Therefore, the ground device can also transmit, to a train running within the same feeding section but out of the communication range of the on-board device installed in a train in a regenerative braking state, a power absorption command that instructs the train to absorb the regenerative power. Accordingly, it is possible for the trains running within the same feeding section but out of the communication range of the on-board device to receive and supply power from and to each other. This can increase the number of opportunities to receive and supply power. The ground device in the first embodiment uses the first table, in which the first priority for absorbing the regenerative power is described, to determine a train that absorbs the regenerative power. Therefore, an appropriate train can be selected as a regenerative-power-absorption target.

Further, the on-board device in the first embodiment transmits the running-state information and the storage-battery-state information to the ground device, and receives, from the ground device, a power absorption command that instructs the train to absorb the regenerative power. Accordingly, it is possible for the train to receive and supply power from and to a train running within the same feeding section but out of the communication range. This can increase the number of opportunities to receive and supply power.

Therefore, in the train-energy control system in the first embodiment, the on-board devices installed in a plurality of trains running within the same feeding section transmit the running-state information and the storage-battery-state information to the ground device, and then the ground device recognizes these pieces of information. The ground device can also transmit, to a train running within the same feeding section but out of the communication range of the on-board device installed in a train in a regenerative braking state, a power absorption command that instructs the train to absorb the regenerative power. The on-board device can receive the power absorption command. Accordingly, it is possible for the trains running within the same feeding section but out of the communication range of the on-board device to receive and supply power from and to each other. This can increase the number of opportunities to receive and supply power. Further, a plurality of trains running within the same feeding section can be targets of reception and supply of power. Therefore, even when a storage battery of the adjacent train within the communication range of the on-board device is in a state of being incapable of absorbing power and is not appropriate as a target of reception and supply of power, a train running within the same feeding section but out of the communication range can still be selected as a target of reception and supply of power. This can increase the number of opportunities to receive and supply power. Consequently, the regenerative power can be more effectively used. The train-energy control system in the first embodiment uses the first table, in which the first priority for absorbing the regenerative power is described, to determine a train that absorbs the regenerative power. Therefore, an appropriate train can be selected as a regenerative-power-absorption target.

Second Embodiment

In the first embodiment, when the control unit 15 in the ground device 6 determines the train 4 appropriate to absorb the regenerative power (at Step S65 in FIG. 6), the control unit 15 uses the evaluation table (the first table in FIG. 7) that is set on the basis of the present running state and in which the evaluation score that indicates the priority (the first priority) of a power-absorption target is described. In a second embodiment, at Step S65 in FIG. 6, in addition to the evaluation table of the first embodiment, an evaluation table (a second table) that is set on the basis of the future running state and in which the evaluation score that indicates the priority (a second priority) of a power-absorption target is described is also used so as to determine the train 4 appropriate to absorb the regenerative power. The method for determining the appropriate train 4 is described below.

FIG. 8 is a diagram schematically illustrating a second condition of the trains 4A to 4C in the second embodiment of the present invention. In FIG. 8, the train 4A is in a regenerative braking state, the train 4B is in a coasting state, and the train 4C is in an accelerating state. The train 4B is currently running in the flat section and will soon approach the upward-gradient section. This indicates that the future running state of the train 4B after a lapse of a predetermined period from the present time is an accelerating state. The train 4C is currently running in the upward-gradient section and will soon approach the flat section. This indicates that the future running state of the train 4C is a coasting state. The ground device 6 determines the train 4 that is caused to absorb regenerative power of the train 4A and transmits, to the determined train 4 (the train 4B), a power absorption command that instructs the train 4 to absorb the regenerative power.

Figure 9:
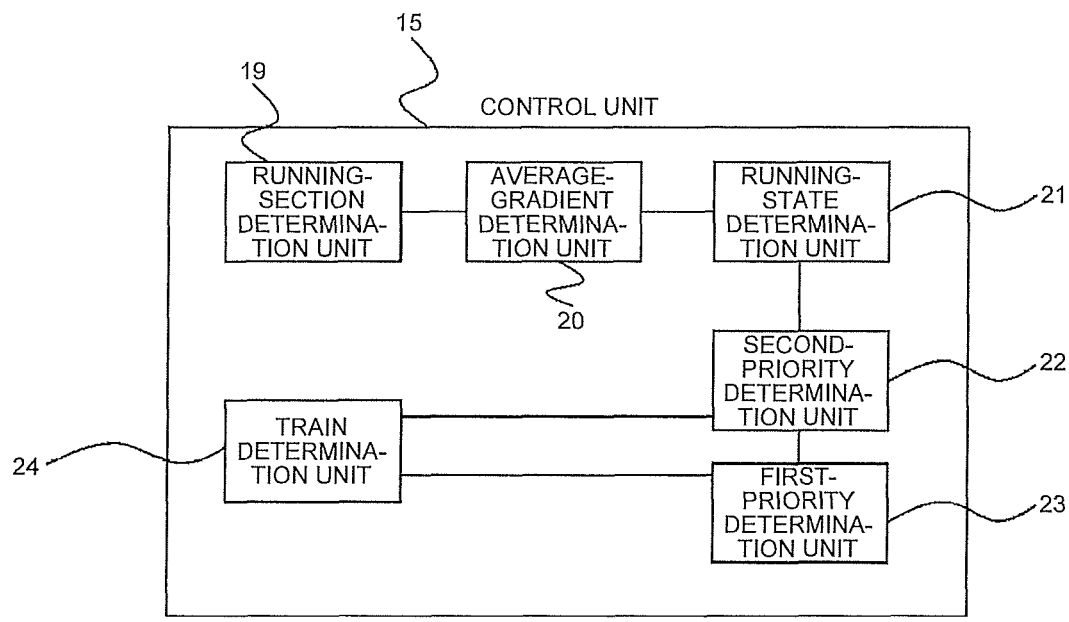
FIG. 9 is an explanatory diagram of a configuration of a control unit 15 in a ground device 6 according to the second embodiment.

FIG. 9 is an explanatory diagram of a configuration of the control, unit 15 in the ground device 6 according to the second embodiment of the present invention. The control unit 15 includes a running-section determination unit 19, an average-gradient determination unit 20, a running-state determination unit 21, a first-priority determination unit 23, a second-priority determination unit 22, and a train determination unit 24. The running-section determination unit 19 determines the future running section after a lapse of a predetermined period from the present time on the basis of the information on the present running position (in kilometers), and the speed and route information, which are included in the train information received from the on-board device 11. The average-gradient determination unit 20 receives the future running section from the running-section determination unit 19 and refers to the gradient data on the train line along which the train runs, stored in advance in the storage unit 16, to determine the average gradient in the future running section. On the basis of the value of average gradient, the running-state determination unit 21 determines the future running state in the future running section. The second-priority determination unit 22 uses an evaluation table that is stored in advance in the storage unit 16 as a second reference table (a second table), that is set on the basis of the future running state, and in which the evaluation score that indicates the priority of a power-absorption target is described so as to determine a future evaluation score E(F) that defines the priority of each train, and determines the second priority of the appropriate train to absorb the regenerative power. The first-priority determination unit 23 uses the first table (FIG. 7) in the first embodiment to determine a present evaluation score E(R) that defines the priority on the basis of the present running state and storage battery state of each of the trains 4 and to determine the first priority of the train 4 appropriate to absorb the regenerative power. The train determination unit 24 obtains the first priority from the first-priority determination unit 23 and obtains the second priority from the second-priority determination unit 22, and then collectively evaluates the first priority and the second priority to determine the train 4 appropriate to absorb the regenerative power.

Figure 10:
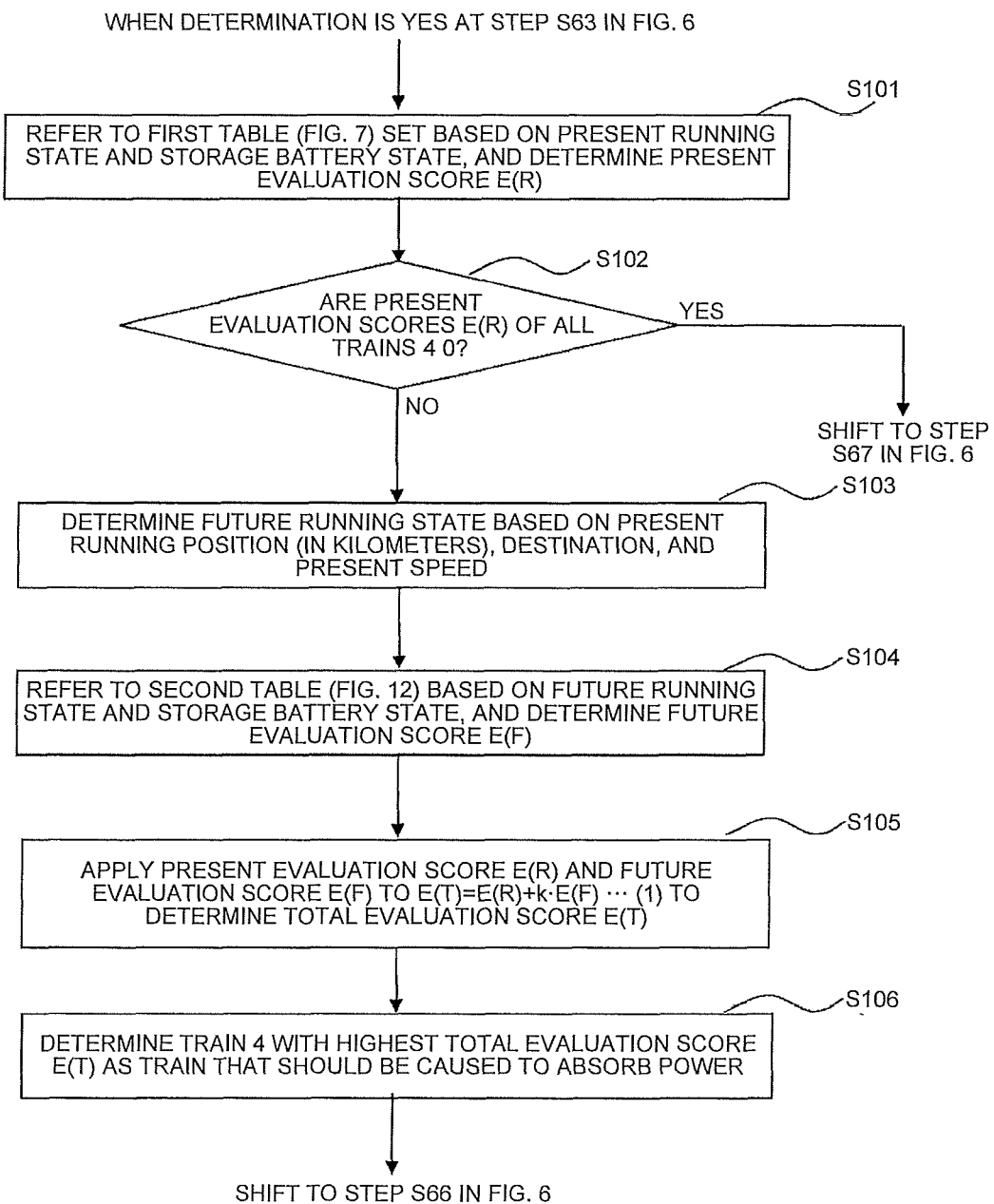
FIG. 10 is a flowchart illustrating a process of determining an appropriate train for a power-discharge target in the second embodiment.

FIG. 10 is a flowchart illustrating a process of determining the train 4 appropriate for a power-discharge target in the second embodiment of the present invention. FIG. 10 illustrates Steps S64 and S65 in FIG. 6 in detail. In FIG. 10, when the determination is YES at Step S63 in FIG. 6, the process flow advances to Step S101. Step S101 indicates that the first-priority determination unit 23 determines the present evaluation score E(R) of each of the trains 4. At Step S102, whether the present evaluation scores E(R) of all the trains 4 are 0 is determined. When the present evaluation scores E(R) of all the trains 4 are 0, the process flow advances to Step S67 in FIG. 6. The process to advance to Step S67 in FIG. 6 corresponds to the case where there is no train 4 that is caused to absorb the power at Step S64 in FIG. 6. At Step S102 in FIG. 10, when the present evaluation scores E(R) of not all the trains 4 are 0, the process flow advances to Step S103. At Step S103, on the basis of the present running position (in kilometers), the destination, and the present speed, the running-state determination unit 21 determines the future running state. Step S103 is described in detail with reference to FIG. 11. At Step S104, on the basis of the future running state determined at Step S103 and the storage battery state, the second-priority determination unit 22 refers to the second table stored in the storage unit 16 to determine the future evaluation score E(F). The second table is described in detail with reference to FIG. 12. Step S105 indicates that the present evaluation score E(R) determined at Step S101 is obtained from the first-priority determination unit 23, and then the future evaluation score E(F) determined at Step S104 is obtained from the second-priority determination unit 22, so that the train determination unit 24 determines a total evaluation score E(T) on the basis of the following equation (1).

$$E(T)=E(R)+k \cdot E(F) \qquad (1)$$

In the equation (1), "k" is a weighting coefficient for the future evaluation score E(F) and can be set to any value. For example, the coefficient "k" is set to k=1 when the future evaluation score E(F) is desired to be evaluated equivalently to the present evaluation score E(R), or is set to k=0.5 when the future evaluation score E(F) is desired to be evaluated by 50% of the present evaluation score E(R).

At Step S106, the train determination unit 24 determines the train with the highest total evaluation score E(T) as an appropriate train to absorb power and then shifts to Step S66 in FIG. 6.

Figure 11:
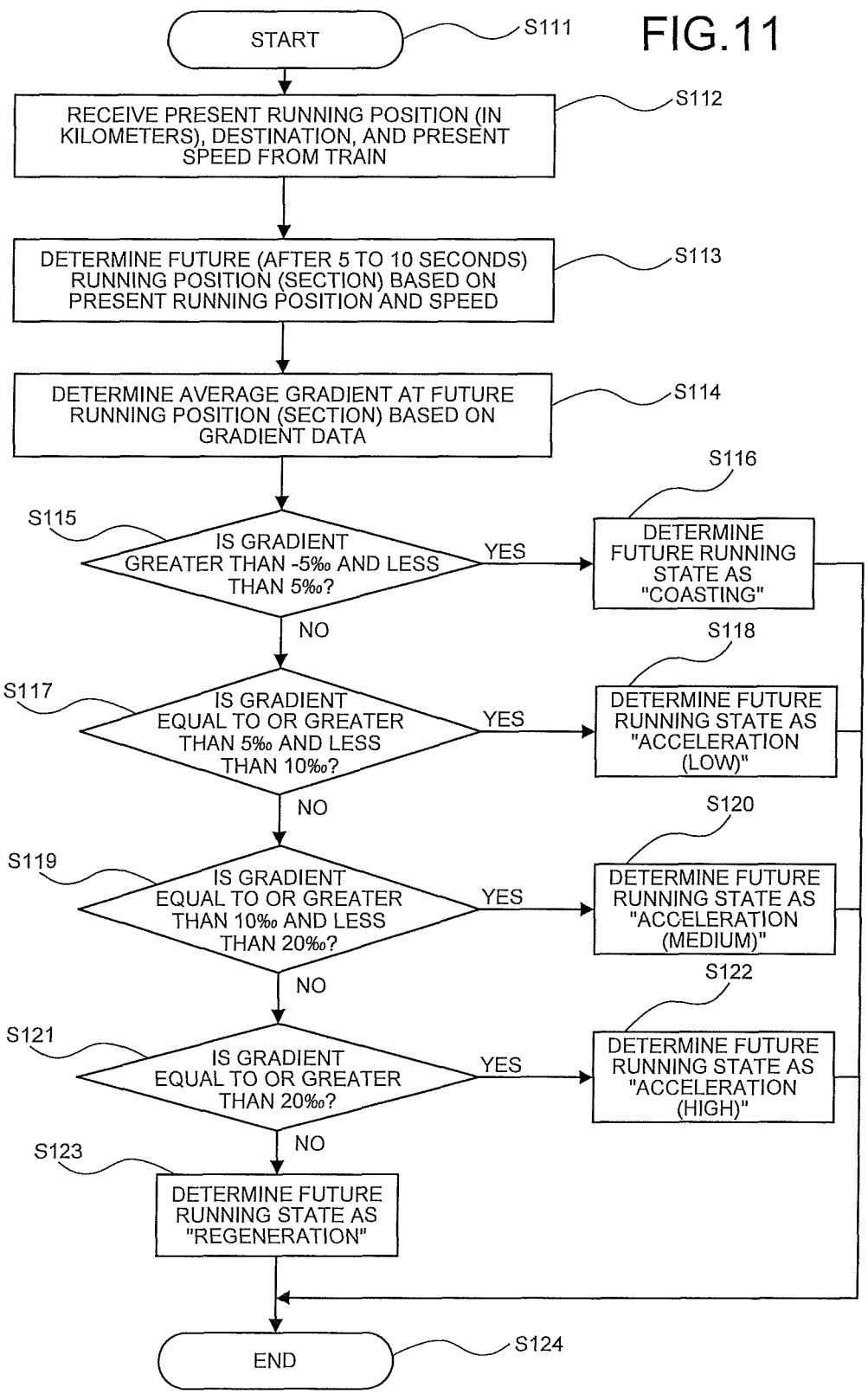
FIG. 11 is a flowchart in which a future running state is determined in the second embodiment.

FIG. 11 is a flowchart illustrating a process of determining a future running state in the second embodiment of the present invention. FIG. 11 describes the details of the process of determining the future running state at Step S104 in FIG. 10. Step S111 indicates the start of the process. Step S112 indicates that the ground transmitting and receiving unit 17 receives train information, and the running-section determination unit 19 recognizes the present running position (in kilometers), the speed, and the destination, which are included in the train information. At Step S113, the running-section determination unit 19 determines the future running section after a lapse of a predetermined period from the present time on the basis of the present running position, the speed, and the destination. While the predetermined period is 5 to 10 seconds, it is possible to set any period, taking into account the characteristics of the train line and the train 4, and other factors. At Step S114, the average-gradient determination unit 20 receives the future running section from the running-section determination unit 19, and refers to the gradient data on the train line along which the train runs, stored in advance in the storage unit 16, to determine the average gradient in the future running section. Steps S115 to S124 indicate that the running-state determination unit 21 determines the future running state on the basis of the average gradient in the future running section. Hereinafter, in the case where the future running state is an accelerating state, the accelerating state is categorized as acceleration (low), acceleration (medium), or acceleration (high). This indicates that the power at the time of acceleration is relatively greater during the acceleration (medium) than during the acceleration (low), and is relatively greater during the acceleration (high) than during the acceleration (medium). Further, the categorization into acceleration (low), acceleration (medium), and acceleration (high) is defined according to the average gradient in the future running section. However, the values of the gradient illustrated in FIG. 11 are merely an example, and it is possible to set any gradient value.

At Step S115, when the average gradient is greater than −5‰ and less than 5‰, the running-state determination unit 21 determines that the future running state is a coasting state at Step S116 and then ends the process (Step S124). A negative value of the average gradient represents a downward gradient and a positive value of the average gradient represents an upward gradient. At Step S115, when the average gradient falls outside the range greater than −5‰ and less than 5‰, the running-state determination unit 21 advances the process to Step S117. At Step S117, when the gradient is equal to or greater than 5‰ and less than 10‰, the running-state determination unit 21 determines that the future running state is an acceleration (low) state at Step S118 and then ends the process (Step S124). At Step S117, when the gradient falls outside the range equal to or greater than 5‰ and less than 10‰, the running-state determination unit 21 advances the process to Step S119. At Step S119, when the gradient is equal to or greater than 10‰ and less than 20‰, the running-state determination unit 21 determines that the future running state is an acceleration (medium) state at Step S120, and then ends the process (Step S124). At Step S119, when the gradient falls outside the range equal to or greater than 10‰ and less than 20‰, the running-state determination unit 21 advances the process to Step S121. At Step S121, when the gradient is equal to or greater than 20‰, the running-state determination unit 21 determines that the future running state is an acceleration (high) state at Step S122 and then ends the process (Step S124). At Step S121, when the gradient falls outside the range equal to or greater than 20‰, the running-state determination unit 21 advances the process to Step S123. At Step S123, the running-state determination unit 21 determines that the future running state is a regenerative braking state and then ends the process (Step S124).

Figures 12, 13:
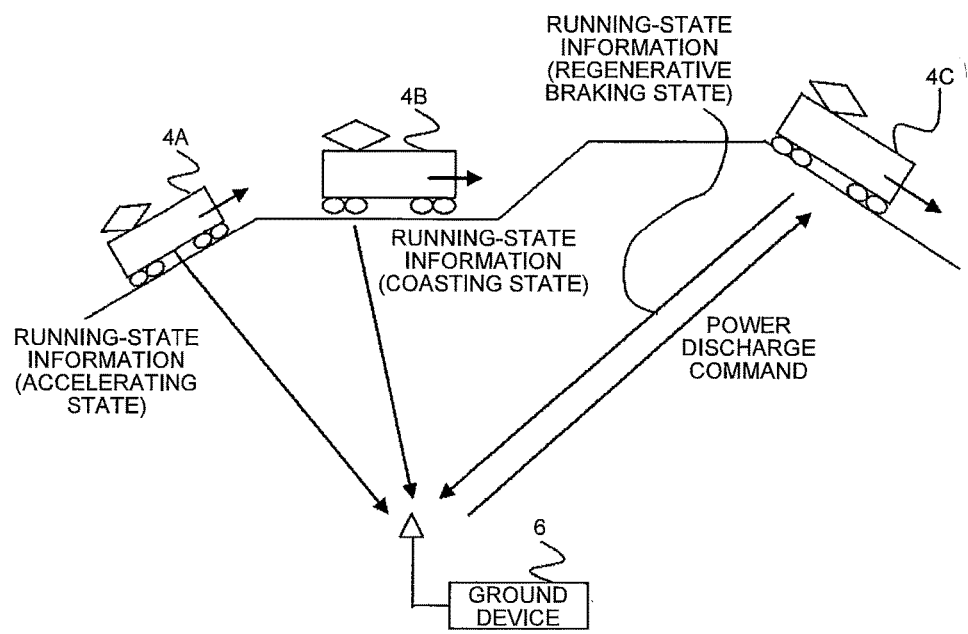
FIG. 12 is an evaluation table in which an evaluation score that indicates the priority of a power-absorption target is described in the second embodiment.
FIG. 13 is a diagram schematically illustrating a third condition of the trains 4A to 4C in a third embodiment.

FIG. 12 is an example of an evaluation table in which an evaluation score that indicates the priority of a power-absorption target is described in the second embodiment of the present invention. The evaluation table in FIG. 12 is stored as a reference table (a second table) in the storage unit 16 in the same manner as the evaluation table in FIG. 7. It is possible to set the evaluation score to any value. At Step S105 in FIG. 10, the second-priority determination unit 22 obtains the future running state from the running-state determination unit 21 and then applies the future running state and the storage battery state to the reference table in FIG. 12, so as to determine a future evaluation score E(F). In FIG. 12, a train, in which its future running state is acceleration (medium), is considered to be more appropriate for a power-absorption target than acceleration (low). Also, a train, in which its future running state is acceleration (high), is considered to be more appropriate for a power-absorption target than acceleration (medium). Therefore, the evaluation score of the train as a power-absorption target is set to become higher in the order of acceleration (low), acceleration (medium), and acceleration (high). Further, the train 4 in which its future running state is a regenerative braking state cannot be a power-absorption target. Therefore, the future evaluation score E(F) is set to 0. In FIG. 12, the future running state of a regenerative-power-discharge target train is not described. The regenerative-power-discharge target train is presumed to continue its present running state. When this running state changes, the train is no longer a regenerative-power-discharge target train. Therefore, it is considered ineffective to define the future running state. Accordingly, when the total evaluation score E(T) of a regenerative-power-discharge target train is determined by using the equation (1), E(F)=E(R) is established for convenience sake or E(F)=0 is established where the coefficient "k" is set to a small value, so as to determine E(T).

When the first-priority determination unit 23 determines the present evaluation score E(R), the present running state described in the first table is not categorized as acceleration (low), acceleration (medium), or acceleration (high) according to the average gradient, which is different from the future running state described in the second table. This is for the sake of simplicity. Additionally, train information on each of the trains 4 includes information on the acceleration power, and therefore it is possible to identify the amount of acceleration power without depending on the average gradient. Accordingly, it is also possible to add the acceleration power of each of the trains 4 to the first table as needed, so as to determine the first priority of each of the trains 4.

With reference back to FIG. 8, the flow of instructing a train to absorb the regenerative power in the present embodiment is specifically described. It is assumed that the train 4B is currently in a coasting state (storage battery state: empty) and the running-state determination unit 21 determines that the average gradient in the future running section is 25‰ (an upward gradient). It is determined that the future running state at this time is acceleration (high) according to FIG. 10. The future evaluation score E(F) is 100 points according to FIG. 12. The present evaluation score E(R) is 7 points according to FIG. 7. Where the coefficient "k" is 1 in the equation (1), it is determined that the total evaluation score E(T) of the train 4B is 107 points. Further, it is assumed that the train 4C is currently in an accelerating state (storage battery state: medium) and the running-state determination unit 21 determines that the average gradient in the future running section is −3‰ (a 3‰ downward gradient). It is determined that the future running state at this time is a coasting state according to FIG. 11 and the future evaluation score E(F) is 5 points according to FIG. 12. The present evaluation score is 100 points according to FIG. 7. Where the coefficient "k" is 1 in the equation (1) in the same manner as the train 4B, it is determined that the total evaluation score is 105 points. In contrast, when the storage battery state of the train 4A is assumed to be fully charged, the present evaluation score E(R) is 0 points according to FIG. 7. Where the future evaluation score is established as E(F)=E(R) for convenience sake and the coefficient "k" is 1, it is determined that the total evaluation score E(T) of the train 4A 0 points. As described above, when the evaluation also takes the future running state into account, the train 4B obtains the highest evaluation score. Therefore, the train 4B is determined as the train 4 appropriate to absorb power.

As described above, the ground device in the second embodiment recognizes the information on the present running position, the destination, and the present speed of a plurality of trains running within the same feeding section, and then determines the future running state of the trains running within the same feeding section, so as to determine a train that is caused to absorb the regenerative power on the basis of the present running state and the future running state. The ground device determines the train that is caused to absorb the regenerative power on the basis of not only the present running state but also the future running state. Therefore, the ground device can transmit, to a more appropriate train, a power absorption command that instructs the train to absorb the regenerative power. Further, the on-board device in the second embodiment transmits information on the present running position, the destination, and the present speed to the ground device, and receives a power absorption command transmitted to the train determined by the ground device on the basis of the present running state and the future running state. The on-board device receives a power absorption command transmitted to the train determined on the basis of the information including the future running state. Therefore, reception and supply of power can be performed more appropriately. Accordingly, in the train-energy control system in the second embodiment, the on-board device transmits information on the present running position, the destination, and the present speed to the ground device, and the ground device recognizes the information on the present running position, the destination, and the present speed of a plurality of trains running within the same feeding section, and then determines the future running state of the trains running within the same feeding section, so as to determine a train that is caused to absorb the regenerative power on the basis of the present running state and the future running state. Consequently, the ground device can transmit a power absorption command to a more appropriate train. Reception and supply of power can thus be performed more appropriately.

Third Embodiment

In the first embodiment, an explanation has been given of the operation in which, when a certain train 4 is brought into a regenerative braking state, the ground device 6 determines the train 4 that is caused to absorb the regenerative power from among the other trains 4 running in the same feeding section as the certain train 4, and then transmits a power absorption command to the determined train 4. In a third embodiment, an explanation will be given of the operation in which, when a certain train 4 is brought into an accelerating state, the ground device 6 determines the train 4 that is caused to discharge power from among the other trains 4 running in the same feeding section as the certain train 4, and then transmits a power discharge command to the determined train 4.

FIG. 13 is a diagram schematically illustrating a third condition of the trains 4A to 4C in the third embodiment of the present invention. In FIG. 13, each of the trains 4A to 4C running within the same feeding section transmits train information including the running-state information and the storage-battery-state information periodically to the ground device 6. The process of transmitting train information to the ground device 6 is the same as the process in FIG. 5 in the first embodiment. The train 4A is in an accelerating state. The train 4B is in a coasting state. The train 4C is in a regenerative braking state. The ground device 6 determines the train 4 that is caused to discharge power and transmits, to the determined train 4 (the train 4C), a power discharge command that instructs the train 4 to discharge power.

Figure 14:
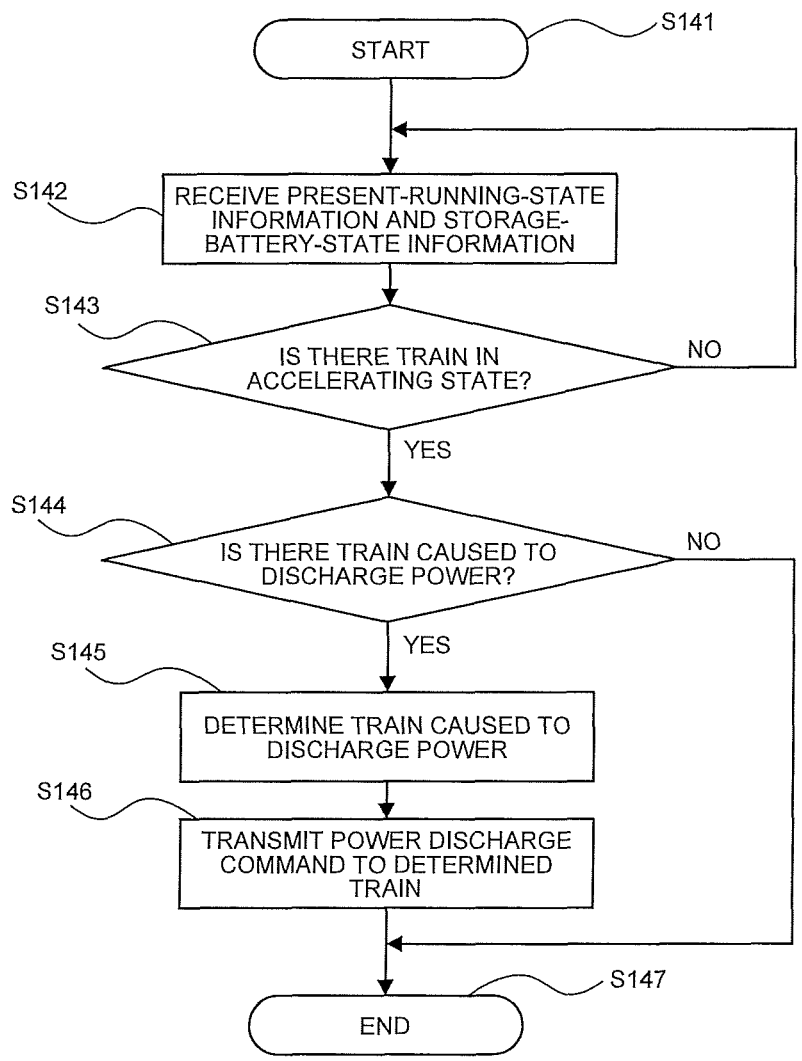
FIG. 14 is a flowchart illustrating a process of transmitting a power discharge command from the ground device in the third embodiment.

FIG. 14 is a flowchart illustrating a process of transmitting a power discharge command from the ground device 6 in the third embodiment of the present invention. In the third embodiment, the configuration of the ground device 6 and the on-board device 11 is the same as the configuration of the ground device 6 and the on-board device 11 in the first embodiment illustrated in FIG. 3. FIG. 14 corresponds to FIG. 6 in the first embodiment. In FIG. 14, Step S141 indicates the start of an operation. Step S142 is the same as Step S62 in FIG. 6. At Step S143, the control unit 15 checks the received running-state information on each of the trains 4, and determines whether there is any train 4 that has running-state information indicating an accelerating state (a power-absorption target train). When there is no train 4 that has the running-state information indicating an accelerating state (a power-absorption target train), then the process flow returns to Step S142. When there is the train 4 in an accelerating state (a power-absorption target train), the process flow advances to Step S144. At Step S144, on the basis of the running-state information and the storage-battery-state information on each of the trains 4, the control unit 15 determines whether there is any train 4 that is capable of discharging power. When there is the train 4 that is capable of discharging power, the process flow shifts to Step S145. When there is no train 4 that is capable of discharging power, the process flow shifts to Step S147, and then the process flow ends. In the same manner as Step S144, at Step S145, on the basis of the running-state information and the storage-battery-state information, the control unit 15 determines the train 4 appropriate to discharge power. At Step S146, the control unit 15 transmits, to the train 4 determined at Step S145, a power discharge command that instructs this train 4 to discharge power. The power discharge command is transmitted from the control unit 15 to the on-board device 11 via the ground transmitting and receiving unit 17 and the ground antenna 18. The process flow ends at Step S147. The ground device 6 periodically repeats the operation at Steps S141 to S147.

Figures 15, 16:
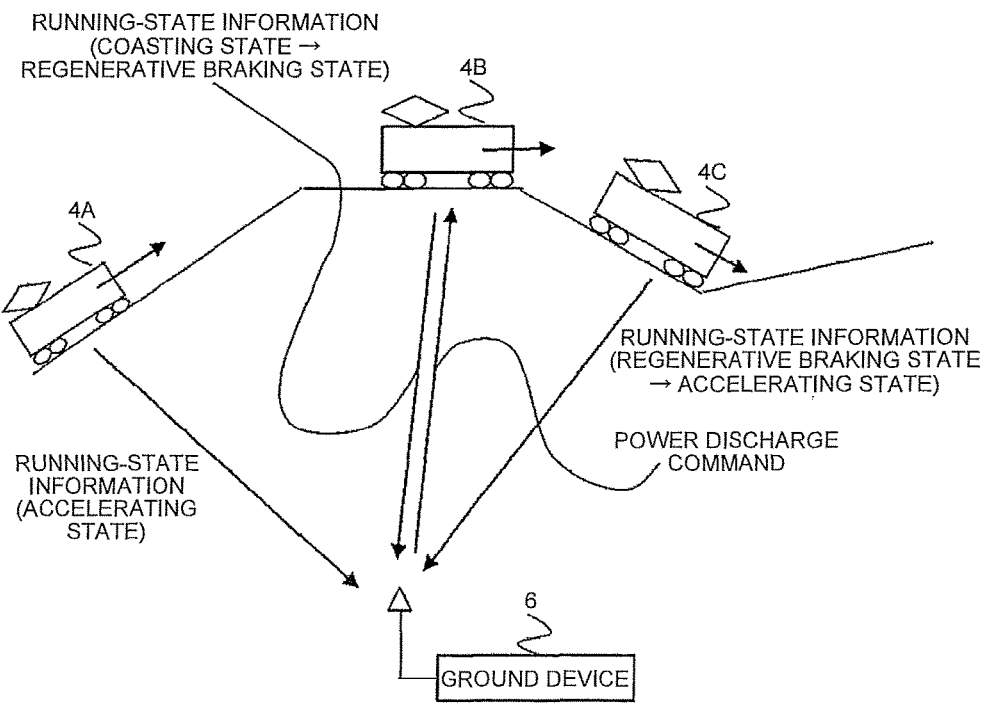
FIG. 15 is an evaluation table in which an evaluation score that indicates the priority of a power-discharge target is described in the third embodiment.
FIG. 16 is a diagram schematically illustrating a fourth condition of the trains 4A to 4C in a fourth embodiment.

FIG. 15 is an example of an evaluation table in which an evaluation score that indicates the priority (a third priority) of a power-discharge target is described in the third embodiment of the present invention. FIG. 15 corresponds to FIG. 7 in the first embodiment. The evaluation table in FIG. 15 is stored as a reference table (a third table) in the storage unit 16 in the same manner as the evaluation table in FIG. 7. It is possible to set the evaluation score to any value. Further, in the items of the present running state in FIG. 15, a power-absorption target train is distinguished from the train 4 in an accelerating state that is other than the power-absorption target train and is running within the same feeding section as the power-absorption target train. When the power-absorption target train is compared with the train 4 in an accelerating state that is other than the power-absorption target train and is running within the same feeding section, it is considered to be more efficient to supply and receive the power within the power-absorption target train. Therefore, the evaluation score of the train 4 in an accelerating state other than the power-absorption target train is set to 0. When the storage battery state of the power-absorption target train is empty and also when the storage battery state of the train 4 in a coasting state other than the power-absorption target train is empty, these trains cannot be a power-discharge target. Accordingly, the evaluation score of the power-absorption target train in which its storage battery state is empty, and the evaluation score of the train 4 in a coasting state in which its storage battery state is empty, other than the power-absorption target train, are both set to 0. At the time of performing the determination at Step S144 in FIG. 14, the control unit 15 reads the reference table (the third table) in FIG. 15 from the storage unit 16, and applies the running-state information and the storage-battery-state information to the reference table to determine the evaluation score of each of the trains 4. In the case where the evaluation scores of all the trains 4 are 0, the control unit 15 determines that there is no train 4 that is capable of discharging power, and then shifts to Step S147 to end the process flow. When there is the train 4 with its evaluation score greater than 0, the control unit 15 determines that there is the train 4 that is capable of discharging power, and then shifts to Step S145. At Step S145, the control unit 15 determines the train 4 with the highest evaluation score as the train 4 appropriate to discharge power. In the case where the evaluation scores of all the trains 4 are 0, there is no train 4 that is capable of discharging power.

In the example in FIG. 13, an explanation will be given of the operation to determine the train 4 that needs to discharge power when the train 4A is brought into an accelerating state. When the storage battery state of the train 4A is fully charged, the control unit 15 determines that the evaluation score E(R) of the train 4A is 10 points. When the train 4B is in a coasting state (storage battery state: full) and the train 4C is in a regenerative braking state (storage battery state: empty), then the control unit 15 determines that the evaluation score E(R) of the train 4B is 7 points and the evaluation score E(R) of the train 4C is 100 points. As a result, the control unit 15 determines the train 4C as the train 4 that is caused to discharge power.

In the example of FIG. 13, the train 4 equipped with the storage battery 10 is assumed to be a power-discharge target. However, a power storage facility (not illustrated) located on the ground, e.g., inside the station or on a railroad, may be determined as a power-discharge target. The power storage facility located on the ground can be regarded the same as the train 4 in a coasting state. Therefore, the evaluation score of the power storage facility can be determined by using the reference table (the third table) in FIG. 15. The evaluation score of the train 4 in a coasting state may be used as an evaluation score of the power storage facility in the reference table (the third table) in FIG. 15, or the evaluation score of the power storage facility may be set separately from the train 4 in a coasting state.

As described above, the train-energy control system in the third embodiment includes a ground device including a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train, and a control unit that, when the running-state information on one or more of the trains indicates an accelerating state, determines a train that discharges power from among the trains on a basis of the running-state information and the storage-battery-state information on the trains, and controls the ground transmitting and receiving unit such that a power discharge command is transmitted to the determined train; and an on-board device including an on-board transmitting and receiving unit that transmits, to the ground device, the running-state information and the storage-battery-state information, and that receives the power discharge command, and a train-information management unit that, upon reception of the running-state information that indicates a regenerative braking state or an accelerating state from a control device, controls the running-state information such that the running-state information is transmitted by the on-board transmitting and receiving unit, the control device returning regenerative power generated from a motor to an overhead wire or charging the storage battery with the regenerative power, and supplying power from the overhead wire or the storage battery to the motor, and, upon reception of the power discharge command by the on-board transmitting and receiving unit, transmits the power discharge command to the control device.

As described above, the ground device in the third embodiment recognizes the running-state information and the storage-battery-state information on the trains running within the same feeding section. Therefore, the ground device can also transmit, to a train running within the same feeding section but out of the communication range of the on-board device installed in a train in an accelerating state, a power discharge command that instructs the train to discharge power. Accordingly, it is possible for the trains running within the same feeding section but out of the communication range of the on-board device to receive and supply power from and to each other. This can increase the number of opportunities to receive and supply power. The ground device in the third embodiment uses the third table, in which the third priority for discharging power is described, to determine a train that discharges the power. Therefore, an appropriate train can be selected as a power-discharge target.

Further, the on-board device in the third embodiment transmits the running-state information and the storage-battery-state information to the ground device, and receives, from the ground device, a power discharge command that instructs the train to discharge power. Accordingly, it is possible for the train to receive and supply power from and to a train running within the same feeding section but out of the communication range. This can increase the number of opportunities to receive and supply power.

Therefore, in the train-energy control system in the third embodiment, the on-board devices installed in a plurality of trains running within the same feeding section transmit the running-state information and the storage-battery-state information to the ground device, and then the ground device recognizes these pieces of information. The ground device can also transmit, to a train running within the same feeding section but out of the communication range of the on-board device installed in a train in an accelerating state, a power discharge command that instructs the train to discharge power. The on-board device can receive the power discharge command. Accordingly, it is possible for the trains running within the same feeding section but out of the communication range of the on-board device to receive and supply power from and to each other. This can increase the number of opportunities to receive and supply power. Further, a plurality of trains running within the same feeding section can be targets of reception and supply of power. Therefore, even when a storage battery of the adjacent train within the communication range of the on-board device is in a state of being incapable of discharging power and is not appropriate as a target of reception and supply of power, a train running within the same feeding section but out of the communication range can still be selected as a target of reception and supply of power. This can increase the number of opportunities to receive and supply power. Consequently, power can be more effectively used. The train-energy control system in the third embodiment uses the third table, in which the third priority for discharging power is described, to determine a train that discharges power. Therefore, an appropriate train can be selected as a power-discharge target.

Fourth Embodiment

In the second embodiment, when there is the train 4 brought into a regenerative braking state, the control unit 15 collectively refers to the evaluation table in FIG. 7 (the first table) that takes the present running state into account, and the evaluation table in FIG. 12 (the second table) that takes the future running state into account, so as to determine the train 4 appropriate to absorb the regenerative power. In a fourth embodiment, when there is the train 4 brought into an accelerating state, the control unit 15 collectively refers to the evaluation table in FIG. 15 (the third table) that takes the present running state into account, and the evaluation table in FIG. 18 that takes the future running state into account, so as to determine the train 4 that is caused to discharge power. The basic operation of the ground device 6 and the on-board device 11 is the same as that of the second embodiment. The determination method is described below in comparison with the second embodiment.

FIG. 16 is a diagram schematically illustrating a fourth condition of the trains 4A to 4C in the fourth embodiment of the present invention. In FIG. 16, the train 4A is in an accelerating state, the train 4B is in a coasting state, and the train 4C is in a regenerative braking state. The train 4B is currently running in the flat section and will soon approach the downward-gradient section. This indicates that the future running state of the train 4B is a regenerative braking state. The train 4C is currently running in the downward-gradient section and will soon approach the upward-gradient section. This indicates that the future running state of the train 4C is an accelerating state. The ground device 6 determines the train 4 that discharges power and transmits, to the determined train 4 (the train 4B), a power discharge command that instructs the train 4 to discharge power.

Figure 17:
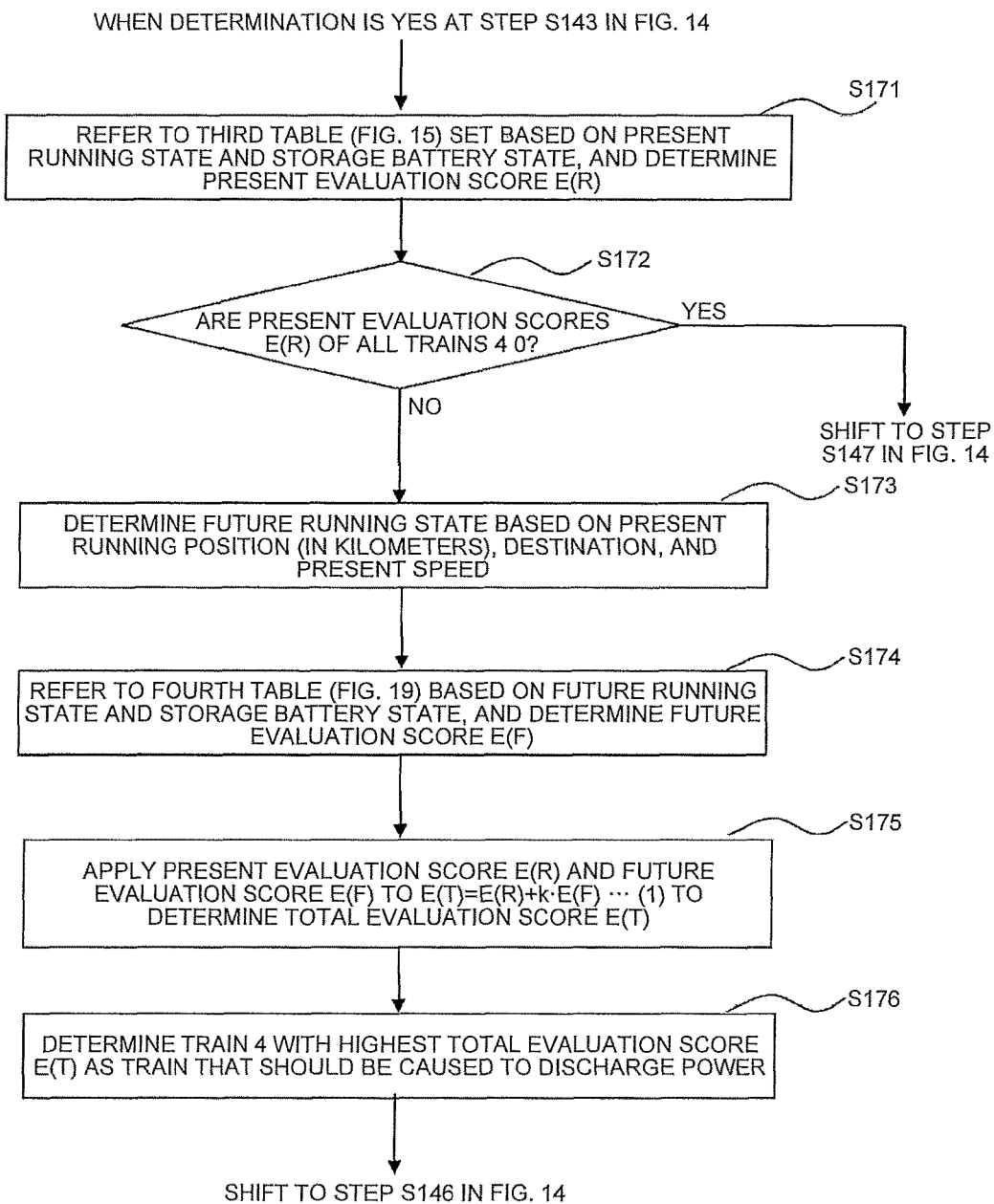
FIG. 17 is a flowchart illustrating a process of determining an appropriate train for a power-discharge target in the fourth embodiment.

FIG. 17 is a flowchart illustrating a process of determining the train 4 appropriate for a power-discharge target in the fourth embodiment of the present invention. FIG. 17 corresponds to FIG. 10 in the second embodiment, and therefore the process flow is described by comparing FIG. 17 with FIG. 10. FIG. 17 illustrates Steps S144 and S145 in FIG. 14 in detail. In FIG. 17, when the determination is YES at Step S143 in FIG. 14, the process flow advances to Step S171 in FIG. 17. Step S171 corresponds to S101 in FIG. 10. At Step S171, by using FIG. 15 (the third table) in place of FIG. 7 (the first table), the first-priority determination unit 23 determines the present evaluation score E(R). Step S172 is the same as Step S102. When the present evaluation scores E(R) of all the trains 4 are 0, the process flow shifts to Step S147 in FIG. 14. At Step S173, on the basis of the present running position (in kilometers), the destination, and the present speed, the running-state determination unit 21 determines the future running state. Step S173 is described in detail with reference to FIG. 18. At Step S174, the second-priority determination unit 22 uses FIG. 19 (a fourth table) in place of FIG. 12 (the second table) to determine a future evaluation score E(F). Step S175 is the same as Step S105. In the same manner as Step S106, at Step S176, the train determination unit 24 determines the train 4 with the highest total evaluation score E(T) at Step S175 as the train 4 that is caused to discharge power.

Figure 18:
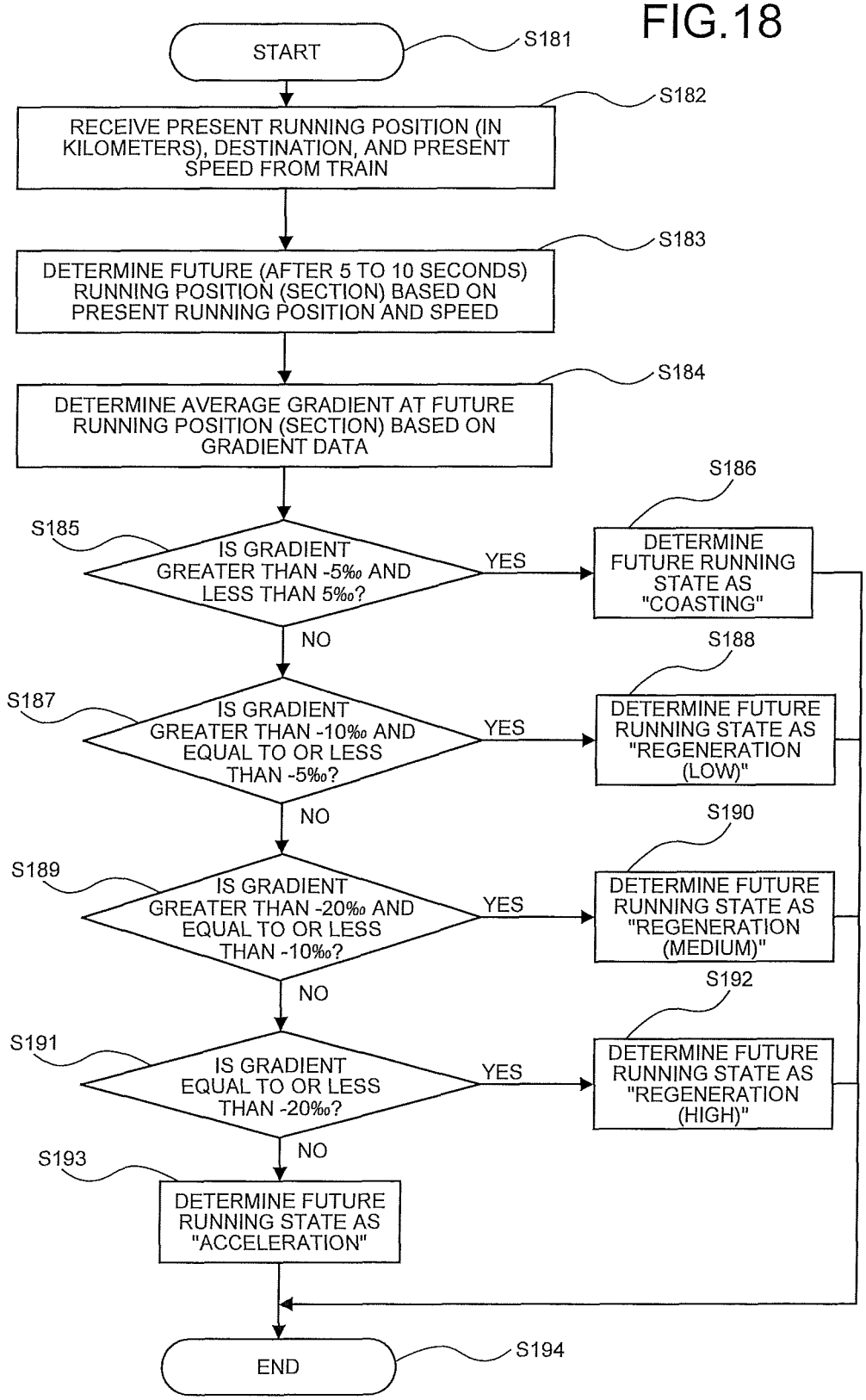
FIG. 18 is a flowchart illustrating a process of determining a future running state in the fourth embodiment.

FIG. 18 is a flowchart illustrating a process of determining a future running state in the fourth embodiment of the present invention. FIG. 18 describes the details of the process of determining the future running state at Step S173 in FIG. 17. FIG. 18 corresponds to FIG. 11 in the second embodiment. In FIG. 18, Steps S181 to S186 are the same as Steps S111 to S116 in FIG. 11, respectively. Steps S187 to S194 indicate that the running-state determination unit 21 determines the future running state on the basis of the average gradient in the future running section, similarly to Steps S117 to S124 in FIG. 11. While FIG. 11 illustrates Steps S117 to S124 in detail when the future running state is an accelerating state, FIG. 18 illustrates Steps S187 to S194 in detail when the future running state is a regenerative braking state. Hereinafter, in the case where the future running state is a regenerative braking state, the running state is categorized as regeneration (low), regeneration (medium), or regeneration (high). This indicates that the regenerative power at the time of regenerative braking is relatively higher during the regeneration (medium) than during the regeneration (low), and is relatively higher during the regeneration (high) than during the regeneration (medium). The categorization of the running state at the time of regenerative braking is also defined according to the average gradient in the future running section. However, the values of the gradient illustrated in FIG. 18 are merely an example, and it is possible to set any gradient value.

In FIG. 18, at Step S185, when the average gradient falls outside the range greater than −5‰ and less than 5‰, the running-state determination unit 21 advances the process to Step S187. At Step S187, when the gradient is greater than −10‰ and equal to or less than −5‰, the running-state determination unit 21 determines that the future running state is a regeneration (low) state at Step S188, and then ends the process (Step S194). At Step S187, when the gradient falls outside the range greater than −10‰ and equal to or less than −5‰, the running-state determination unit 21 advances the process to Step S189. At Step S189, when the gradient is greater than −20‰ and equal to or less than −10‰, the running-state determination unit 21 determines that the future running state is a regeneration (medium) state at Step S190 and then ends the process (Step S194). At Step S189, when the gradient falls outside the range greater than −20‰ and equal to or less than −10‰, the running-state determination unit 21 advances the process to Step S191. At Step S191, when the gradient is equal to or less than −20‰, the running-state determination unit 21 determines that the future running state is a regeneration (high) state at Step S192 and then ends the process (Step S194). At Step S191, when the gradient falls outside the range equal to or less than −20‰, the running-state determination unit 21 advances the process to Step S193. At Step S193, the running-state determination unit 21 determines that the future running state is an accelerating state and then ends the process (Step S194).

FIG. 19 is an example of an evaluation table in which an evaluation score that indicates the priority (a fourth priority) of a power-discharge target is described in the fourth embodiment of the present invention. The evaluation table in FIG. 19 is stored as the reference table (the fourth table) in the storage unit 16 in the same manner as the evaluation table in FIG. 15. It is possible to set the evaluation score to any value. At Step S174 in FIG. 17, the second-priority determination unit 22 obtains the future running state from the running-state determination unit 21 and then applies the future running state and the storage battery state to the reference table in FIG. 19, so as to determine a future evaluation score E(F).

In the example in FIG. 16, an explanation will be given of the operation to determine the train 4 that needs to discharge power when the train 4A is brought into an accelerating state. In the case where the train 4B is in a coasting state (storage battery state: medium) and the train 4C is in a regenerative braking state (storage battery state: full), it is determined that the present evaluation scores E(R) of the train 4B and the train 4C are 5 points and 100 points, respectively, by using FIG. 15 (the third table). Next, the average gradient in the future running section determined by the average-gradient determination unit 20 is assumed to be −25‰ for the train 4B (a 25‰ downward gradient) and 10‰ for the train 4C. The running-state determination unit 21 determines the future running state of the train 4B as regeneration (high), and the future running state of the train 4C as acceleration (medium). According to FIG. 18, the second-priority determination unit 22 determines that the future evaluation scores E(F) of the train 4B and the train 4C are 100 points and 0 points, respectively. It is determined that the total evaluation scores E(T) (where k=1) of the train 4B and the train 4C are 105 points and 100 points, respectively. In contrast, when the storage battery state of the train 4A is assumed to be empty, the present evaluation score E(R) is 0 points according to FIG. 15. Where the future evaluation score is established as E(F)=E(R) for convenience sake and the coefficient "k" is 1, it is determined that the total evaluation score E(T) of the train 4A is 0 points. As described above, when the evaluation also takes the future running state into account, the train 4B obtains the highest evaluation score. Therefore, the train 4B is determined as the train 4 that needs to discharge power. The operation to transmit a power discharge command is the same as the operation to transmit a power discharge command in the third embodiment.

As described above, the ground device in the fourth embodiment recognizes the information on the present running position, the destination, and the present speed of a plurality of trains running within the same feeding section, and then determines the future running state of the trains running within the same feeding section, so as to determine a train that is caused to discharge power on the basis of the present running state and the future running state. The ground device determines the train that is caused to discharge power on the basis of not only the present running state but also the future running state. Therefore, the ground device can transmit, to a more appropriate train, a power discharge command that instructs the train to discharge power. Further, the on-board device in the fourth embodiment transmits information on the present running position, the destination, and the present speed to the ground device, and receives a power discharge command transmitted to the train determined by the ground device on the basis of the present running state and the future running state. The on-board device receives a power discharge command transmitted to the train determined on the basis of the information including the future running state. Therefore, reception and supply of power can be performed more appropriately. Accordingly, in the train-energy control system in the fourth embodiment, the on-board device transmits information on the present running position, the destination, and the present speed to the ground device, and the ground device recognizes the information on the present running position, the destination, and the present speed of a plurality of trains running within the same feeding section, and then determines the future running state of the trains running within the same feeding section, so as to determine a train that is caused to discharge power on the basis of the present running state and the future running state. Consequently, the ground device can transmit a power discharge command to a more appropriate train. Reception and supply of power can thus be performed more appropriately.

Fifth Embodiment

In a fifth embodiment, the ground device 6 also has the function of transmitting a power discharge command in the third embodiment, in addition to the function of transmitting a power absorption command in the first embodiment. In the fifth embodiment, the configuration of the ground device 6 and the on-board device 11 is the same as the configuration of the ground device 6 in the first or third embodiment illustrated in FIG. 3 or the configuration of the on-board device 11 in the first or third embodiment illustrated in FIG. 2. Further, the basic operation of the ground device 6 and the on-board device 11 is the same as that of the first or third embodiment.

FIG. 20 is a flowchart illustrating a process of transmitting a power absorption command and a process of transmitting a power discharge command from the ground device 6 in the fifth embodiment of the present invention. FIG. 20 corresponds to FIG. 6 in the first embodiment or corresponds to FIG. 14 in the third embodiment. In FIG. 20, Step S201 indicates the start of an operation. At Step S202, the ground transmitting and receiving unit 17 in the ground device 6 receives train information from the on-board device 11 via the ground antenna 18. At Step S203, the control unit 15 checks the received running-state information on each of the trains 4, and determines whether there is any train 4 that has running-state information indicating a regenerative braking state (referred to as "regenerative-power-discharge target train"). When there is no train 4 that has running-state information indicating a regenerative braking state (the regenerative-power-discharge target train), then the process flow advances to Step S207. When there is the train 4 in a regenerative braking state (the regenerative-power-discharge target train), the process flow advances to Step S204. At Step S204, on the basis of the running-state information and the storage-battery-state information on each of the trains 4, the control unit 15 determines whether there is any train 4 that is capable of absorbing the regenerative power. When there is any train 4 that is capable of absorbing the regenerative power, the process flow shifts to Step S205.

When there is no train 4 that is capable of absorbing the regenerative power, the process flow shifts to Step S211, and then the process flow ends. At Step S205, on the basis of the running-state information and the storage-battery-state information, the control unit 15 determines an appropriate train to absorb power. At Step S206, the control unit 15 transmits, to the train determined at Step S205, a power absorption command that instructs this train to absorb the regenerative power. The power absorption command is transmitted from the control unit 15 to the on-board device 11 via the ground transmitting and receiving unit 17 and the ground antenna 18. The process flow ends at Step S211.

In FIG. 20, at Step S207, the control unit 15 checks the received running-state information on each of the trains 4, and determines whether there is any train 4 that has running-state information indicating an accelerating state (a power-absorption target train). When there is no train 4 that has running-state information indicating an accelerating state (a power-absorption target train), then the process flow returns to Step S203. When there is the train 4 in an accelerating state (a power-absorption target train), the process flow advances to Step S208. At Step S208, on the basis of the running-state information and the storage-battery-state information on each of the trains 4, the control unit 15 determines whether there is any train 4 that is capable of discharging power. When there is any train 4 that is capable of discharging power, the process flow shifts to Step S209. When there is no train 4 that is capable of discharging power, the process flow shifts to Step S211, and then the process flow ends. In the same manner as Step S205, at Step S209, on the basis of the running-state information and the storage-battery-state information, the control unit 15 determines the train 4 appropriate to discharge power. At Step S210, the control unit 15 transmits, to the train 4 determined at Step S209, a power discharge command that instructs this train 4 to discharge power. The power discharge command is transmitted from the control unit 15 to the on-board device 11 via the ground transmitting and receiving unit 17 and the ground antenna 18. The process flow ends at Step S211. The ground device 6 periodically repeats the operation at Steps S201 to S211.

In FIG. 20, Steps S201 and S202 correspond to Steps S61 and S62 in FIG. 6 in the first embodiment, or correspond to Steps S141 and S142 in FIG. 14 in the third embodiment. Steps S203 to S206 in FIG. 20 correspond to Steps S63 to S66 in FIG. 6, respectively. Steps S207 to S210 in FIG. 20 correspond to Steps S143 to S146 in FIG. 14, respectively. Step S211 in FIG. 20 corresponds to Step S67 in FIG. 6 or corresponds to Step S147 in FIG. 14.

As described above, the ground device in the fifth embodiment includes a ground transmitting and receiving unit that receives, from each of a plurality of trains running within a same feeding section, running-state information that indicates a running state, which is any of a regenerative braking state, an accelerating state, and a coasting state, and storage-battery-state information that indicates a state of charge of a storage battery provided in the train; and a control unit that, when the running-state information on one or more of the trains indicates a regenerative braking state, determines a train that absorbs the regenerative power from among the trains on a basis of the running-state information and the storage-battery-state information on the trains, and controls the ground transmitting and receiving unit such that a power absorption command is transmitted to the determined train, and, when the running-state information on one or more of the trains indicates an accelerating state, determines a train that discharges power from among the trains on a basis of the running-state information and the storage-battery-state information on the trains, and controls the ground transmitting and receiving unit such that a power discharge command is transmitted to the determined train.

As described above, the ground device in the fifth embodiment recognizes the running-state information and the storage-battery-state information on the trains running within the same feeding section. Therefore, the ground device can transmit, to a train running within the same feeding section but out of the communication range of the on-board device installed in a train in a regenerative braking state, a power absorption command that instructs the train to absorb the regenerative power. The ground device can also transmit, to a train running within the same feeding section but out of the communication range of the on-board device installed in a train in an accelerating state, a power discharge command that instructs the train to discharge power. Accordingly, it is possible for the trains running within the same feeding section but out of the communication range of the on-board device to receive and supply power from and to each other. This can increase the number of opportunities to receive and supply power.

In the case where at Step S205 in FIG. 20, in addition to the evaluation table (the first table in FIG. 7) that takes the present running state into account, the evaluation table (the second table in FIG. 12) that takes the future running state into account is used to determine the train 4 appropriate to absorb the regenerative power (corresponding to the second embodiment), and where at Step S209, in addition to the evaluation table (the third table in FIG. 15) that takes the present running state into account, the evaluation table (the fourth table in FIG. 18) that takes the future running state into account is used to determine the train 4 that is caused to discharge power (corresponding to the fourth embodiment), it is possible for the ground device 6 in the fifth embodiment to have the function of transmitting a power discharge command in the fourth embodiment, in addition to the function of transmitting a power absorption command in the second embodiment.

REFERENCE SIGNS LIST

1 substation, 2 overhead wire, 3 section, 4, 4A, 4B, 4C train, 5 rail, 6 ground device, 7 pantograph, 8 control device, 9 motor, 10 storage battery, 11 on-board device, 12 train-information management unit, 13 on-board transmitting and receiving unit, 14 on-board antenna, 15 control unit, 16 storage unit, 17 ground transmitting and receiving unit, 18 ground antenna, 19 running-section determination unit, 20 average-gradient determination unit, 21 running-state determination unit, 22 second-priority determination unit, 23 first-priority determination unit, 24 train determination unit, S51 to S211 step

The invention claimed is:

1. A ground device comprising:
a ground transceiver to receive, from each of a plurality of trains running within a same feeding section, running-state information that indicates a running state, which is any of a regenerative braking state, an accelerating state, and a coasting state, and storage-battery-state information that indicates a state of charge of a storage battery provided in the train; and
a controller to determine whether there is a train that has the running-state information indicating a regenerative braking state on a basis of the running-state information on the trains received by the ground transceiver, and, when the running-state information on one or more of the trains indicates a regenerative braking state, determine a train that absorbs regenerative power from among the trains on a basis of the running-state information and the storage-battery-state information on the trains, and control the ground transceiver such that a power absorption command is transmitted to the determined train.

2. The ground device according to claim 1, further comprising a storage to store therein a first table, in which a first priority of a train that absorbs the regenerative power is described, the first table being set on a basis of the running-state information and the storage-battery-state information, wherein the controller determines a train that absorbs the regenerative power on a basis of the running-state information, the storage-battery-state information, and the first table.

3. The ground device according to claim 2, wherein the storage stores therein gradient data in a predetermined running section, and stores therein a second table, in which a second priority of a train that absorbs the regenerative power is described, the second table being set on a basis of the storage-battery-state information and future-running-state information that indicates a running state of the trains after a lapse of a predetermined period from a present time, the ground transceiver receives a present position, a destination, and a speed from each of the trains, and the controller includes
  a running-section determiner to determine a future running section on a basis of the present position, the destination, and the speed,
  an average-gradient determiner to refer to the gradient data stored in the storage and determine an average gradient in the future running section,
  a running-state determiner to determine the future running state on a basis of the average gradient,
  a second-priority determiner to derive a second priority from the storage-battery-state information, the future running state, and the second table,
  a first-priority determiner to derive a first priority from the storage-battery-state information, a present running state, and the first table, and
  a train determiner to determine a train that absorbs the regenerative power on a basis of the first priority and the second priority.

4. The ground device according to claim 2, wherein, in the first table, an evaluation score when the running-state information indicates an accelerating state is set to a highest value.

5. The ground device according to claim 2, wherein in the first table, an evaluation value is set to 0 when a train has the running-state information indicating a regenerative braking state and has the storage-battery-state information indicating a fully-charged state and when a train has the running-state information indicating a coasting state and has the storage-battery-state information indicating a fully-charged state.

6. The ground device according to claim 2, wherein in the first table, an evaluation score of a train that has the running-state information indicating a regenerative braking state and has the storage-battery-state information indicating a state other than a fully-charged state is set higher than an evaluation score of a train that has the running-state information indicating a coasting state and has the storage-battery-state information indicating a state other than a fully-charged state.

7. The ground device according to claim 2, further comprising a power storage facility that is a regenerative-power-absorption target and is located on a ground, wherein in the first table, an evaluation score of the power storage facility is set in a similar manner to an evaluation score of a train that has the running-state information indicating a coasting state.

8. The ground device according to claim 1, wherein, for the determination of the train to absorb regenerative power from among the trains, a train having running-state information indicating the accelerating state is prioritized over a train having running-state information indicating the coasting state.

9. A ground device comprising:

a ground transceiver to receive, from each of a plurality of trains running within a same feeding section, running-state information that indicates a running state, which is any of a regenerative braking state, an accelerating state, and a coasting state, and storage-battery-state information that indicates a state of charge of a storage battery provided in the train; and a controller to determine whether there is a train that has the running-state information indicating an accelerating state on a basis of the running-state information on the trains received by the ground transceiver, and, when the running-state information on one or more of the trains indicates an accelerating state, determine a train that discharges power from among the trains on a basis of the running-state information and the storage-battery-state information on the trains, and control the ground transceiver such that a power discharge command is transmitted to the determined train.

10. The ground device according to claim 9, further comprising a storage to store therein a third table, in which a first priority of a train that discharges the power is described, the third table being set on a basis of the running-state information and the storage-battery-state information, wherein the controller determines a train that discharges the power on a basis of the running-state information, the storage-battery-state information, and the third table.

11. The ground device according to claim 10, wherein the storage stores therein gradient data in a predetermined running section, and stores therein a fourth table, in which a second priority of a train that discharges the power is described, the fourth table being set on a basis of the storage-battery-state information and future-running-state information that indicates a running state of the trains after a lapse of a predetermined period from a present time, the ground transceiver receives a present position, a destination, and a speed from each of the trains, and the controller includes
  a running-section determiner to determine a future running section on a basis of the present position, the destination, and the speed,
  an average-gradient determiner to refer to the gradient data stored in the storage, and determine an average gradient in the future running section,
  a running-state determiner to determine the future running state on a basis of the average gradient,
  a second-priority determiner to derive a second priority from the storage-battery-state information, the future running state, and the fourth table,
  a first-priority determiner to derive a first priority from the storage-battery-state information, a present running state, and the third table, and a train determiner to determine a train that discharges the power on a basis of the first priority and the second priority.

12. The ground device according to claim 10, wherein, in the third table, an evaluation score when the running-state information indicates a regenerative braking state is set to a highest value.

13. The ground device according to claim 10, wherein in the third table, an evaluation value is set to 0 when a train has the running-state information indicating an accelerating state and has the storage-battery-state information indicating empty and when a train has the running-state information indicating a coasting state and has the storage-battery-state information indicating empty.

14. The ground device according to claim 10, wherein in the third table, an evaluation score of a train that has the running-state information indicating an accelerating state and has the storage-battery-state information indicating a state other than empty is set higher than an evaluation score of a train that has the running-state information indicating a coasting state and has the storage-battery-state information indicating a state other than empty.

15. The ground device according to claim 10, further comprising a power storage facility that is a power-discharge target and is located on a ground, wherein
in the third table, an evaluation score of the power storage facility is set in a similar manner to an evaluation score of a train that has the running-state information indicating a coasting state.

16. The ground device according to claim 9, wherein, for the determination of the train to discharge power from among the trains, a train having running-state information indicating the regenerative braking state is prioritized over a train having running-state information indicating the coasting state.

* * * * *